United States Patent
Yu et al.

(10) Patent No.: US 12,463,853 B2
(45) Date of Patent: Nov. 4, 2025

(54) EXTENDING COMMUNICATION RANGE OF WIRELESS DEVICES OPERATING IN A 6 GIGAHERTZ BAND

(71) Applicant: Avalon Technology Solutions LLC, Frisco, TX (US)

(72) Inventors: Heejung Yu, Daejeon (KR); Yujin Noh, Irvine, CA (US); Jong-ee Oh, Irvine, CA (US); Jaeyoung Ryu, Irvine, CA (US)

(73) Assignee: Avalon Technology Solutions LLC, Frisco, TX (US)

( * ) Notice: Subject to any disclaimer, the term of this patent is extended or adjusted under 35 U.S.C. 154(b) by 0 days.

(21) Appl. No.: 17/396,481

(22) Filed: Aug. 6, 2021

(65) Prior Publication Data

US 2022/0045889 A1 Feb. 10, 2022

Related U.S. Application Data

(60) Provisional application No. 63/066,612, filed on Aug. 17, 2020, provisional application No. 63/063,777, filed on Aug. 10, 2020.

(51) Int. Cl.
| | |
|---|---|
| *H04W 4/00* | (2018.01) |
| *H04L 5/00* | (2006.01) |
| *H04L 27/26* | (2006.01) |
| *H04W 24/02* | (2009.01) |
| *H04W 72/0453* | (2023.01) |

(52) U.S. Cl.
CPC ........ *H04L 27/2602* (2013.01); *H04L 5/0007* (2013.01); *H04W 24/02* (2013.01); *H04W 72/0453* (2013.01)

(58) Field of Classification Search
CPC . H04L 5/0001; H04L 5/0007; H04W 72/0453
See application file for complete search history.

(56) References Cited

U.S. PATENT DOCUMENTS

9,119,110 B2 * 8/2015 Merlin .................. H04W 28/20
9,729,214 B2 * 8/2017 Chu .................... H04L 27/2628
(Continued)

FOREIGN PATENT DOCUMENTS

WO  WO-2020187208 A1 * 9/2020 ........... H04L 1/0006

OTHER PUBLICATIONS

IEEE 802.Nov. 2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
(Continued)

*Primary Examiner* — Elisabeth Benoit Magloire
(74) *Attorney, Agent, or Firm* — Nutter McClennen & Fish LLP

(57) ABSTRACT

A method by a wireless device to extend communication range when operating in a 6 Gigahertz (GHz) band of a wireless network is described. The method includes generating a physical layer protocol data unit (PPDU) that includes a preamble portion and a data portion that includes first data and transmitting the PPDU through a wireless medium on a transmission channel that is subdivided into a plurality of resource units (RUs), wherein the first data is duplicated in the data portion in a frequency domain in units of RUs.

20 Claims, 36 Drawing Sheets

(56) References Cited

U.S. PATENT DOCUMENTS

| | | | | |
|---|---|---|---|---|
| 10,742,472 | B1* | 8/2020 | Van Nee | H04L 27/36 |
| 2013/0315163 | A1* | 11/2013 | Zhang | H04L 5/001 |
| | | | | 370/329 |
| 2016/0316473 | A1* | 10/2016 | Wang | H04W 24/08 |
| 2017/0041929 | A1* | 2/2017 | Noh | H04L 5/0094 |
| 2017/0180177 | A1* | 6/2017 | Wu | H04L 1/04 |
| 2017/0238232 | A1* | 8/2017 | Yang | H04L 5/0007 |
| | | | | 370/328 |
| 2018/0007661 | A1* | 1/2018 | Chun | H04W 72/04 |
| 2018/0048509 | A1* | 2/2018 | Huang | H04L 1/0041 |
| 2018/0092123 | A1* | 3/2018 | Liu | H04L 5/0007 |
| 2020/0125511 | A1* | 4/2020 | Thubert | G06F 15/17331 |
| 2020/0404589 | A1* | 12/2020 | Wang | H04W 52/0235 |
| 2021/0014694 | A1* | 1/2021 | Li | H04J 13/0062 |
| 2021/0051664 | A1* | 2/2021 | Bhattacharya | H04L 1/203 |
| 2021/0075580 | A1* | 3/2021 | Thubert | H04W 72/0453 |
| 2021/0289500 | A1* | 9/2021 | Yang | H04W 72/0453 |
| 2021/0385688 | A1* | 12/2021 | Liu | H04L 27/2603 |
| 2022/0077964 | A1* | 3/2022 | Wang | H04L 1/1825 |
| 2022/0103408 | A1* | 3/2022 | Park | H04L 5/0051 |

OTHER PUBLICATIONS

IEEE P802.11ax/D6.1, "Draft Standard for Information technology–Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, May 2020, 784 pages.

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks-Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

* cited by examiner

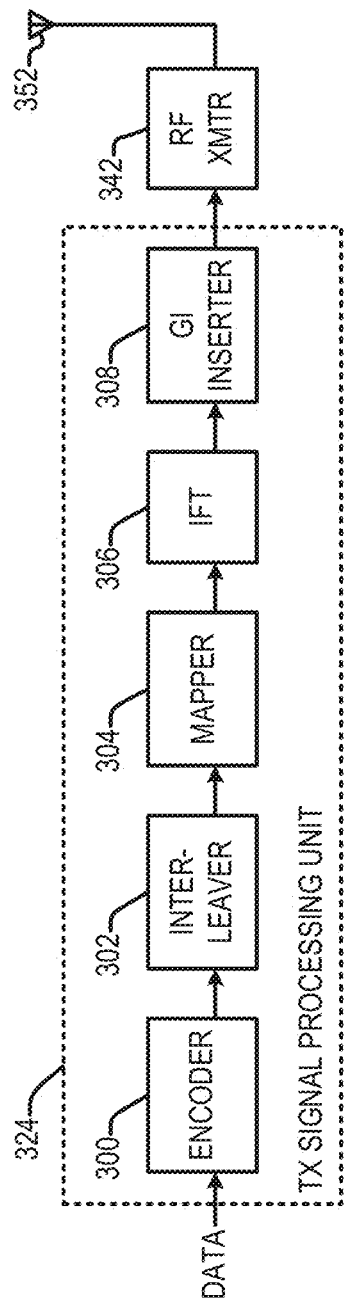
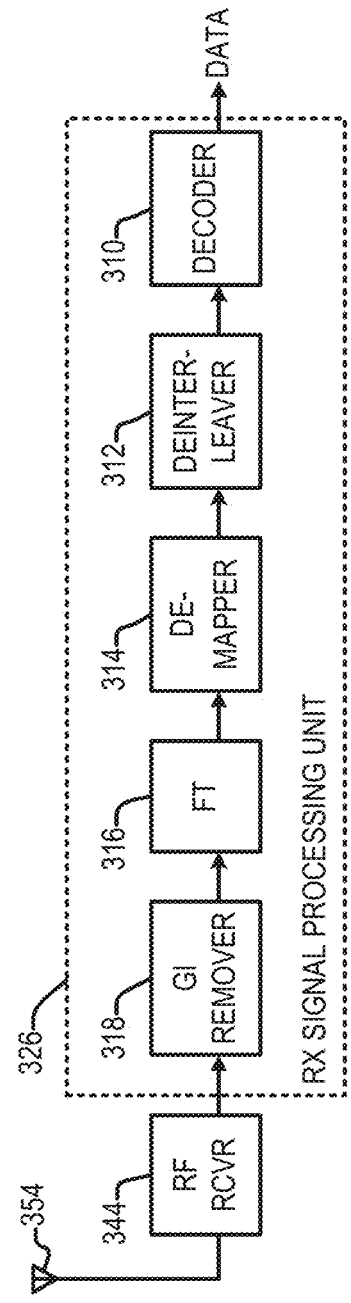

| MAXIMUM PHY RATE | PHY RATE ENHANCEMENT | BANDWIDTH/NUMBER OF SPATIAL STREAMS | OPERATING BANDS | |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 µs | - | - | equivalent to 1,250 kHz |
| LEGACY-LONG TRAINING FIELD (L-LTF) 714 | NON-HT LONG TRAINING FIELD (LTF) | 8 µs | 3.2 µs | 1.6 µs | 312.5 kHz |
| LEGACY-SIGNAL FIELD (L-SIG) 716 | NON-HT SIGNAL FIELD | 4 µs | 3.2 µs | 0.8 µs | 312.5 kHz |
| RL-SIG FIELD 718 | REPEATED NON-HT SIGNAL FIELD | 4 µs | 3.2 µs | 0.8 µs | 312.5 kHz |
| U-SIG FIELD 720 | UNIVERSAL SIGNAL FIELD | $N_{USIG}$ * 4 µs | 3.2 µs | 0.8 µs | 312.5 kHz |
| EHT-SIG FIELD 722 | EHT SIGNAL FIELD | $N_{EHTSIG}$ * 4 µs | 3.2 µs | 0.8 µs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) µs | 2xLTF: 6.4 µs 4xLTF: 12.8 µs | 0.8, 1.6, or 3.2 µs | 2xLTF: (equivalent to) 156.25 kHz; 4xLTF: 78.125 kHz |
| EHT-DATA FIELD 730 | EHT DATA FIELD | $N_{DATA}$ * (DTF period + GI) µs | 12.8 µs | 0.8, 1.6, or 3.2 µs | 78.125 kHz |
| EHT-MA FIELD 732 | EHT MIDAMBLE FIELD | - | - | - | - |

FIG. 7

| L-STF 802 | L-LTF 804 | L-SIG 806 | RL-SIG 808 | U-SIG1 810 | U-SIG2 812 | EHT-SIG 814 | EHT-STF 816 | EHT-LTFS 818 | EHT-DATA 820 |

FIG. 8

| EHT-STF 1002 | EHT-LTF 1004 | U-SIG1 1006 | U-SIG2 1008 | EHT-SIGS, EHT-LTFS, EHT-DATA 1010 |

EHT-GF

| NGW-STF 1022 | NGW-LTF 1024 | U-SIG1 1026 | U-SIG2 1028 | NGW-SIGS, NGW-LTFS, NGW-DATA 1030 |

NGW-GF

FIG. 10

EHT/NGW AUTODETECTION

| Options | First Symbol | Second Symbol | PHY ID | Detection Results |
|---|---|---|---|---|
| Option 1 | QBPSK | QBPSK | EHT (e.g., value==0) | EHT |
| | QBPSK | QBPSK | $NGW_n$ (e.g., value==n) | $NGW_n$ |
| Option 2 | QBPSK | BPSK | EHT (e.g., value==0 or don't care) | EHT |
| | QBPSK | QBPSK | $NGW_n$ (e.g., value==n) | $NGW_n$ |
| Option 3 | QBPSK | QBPSK | EHT (e.g., value==0 or don't care) | EHT |
| | QBPSK | BPSK | $NGW_n$ (e.g., value==n) | $NGW_n$ |

FIG. 12

MIXED MODE PPDU: L-STF 3102 | L-LTF 3104 | L-SIG 3106 | RL-SIG 3108 | U-SIG 3110 | EHT-SIG 3112 | EHT-STF 3114 | EHT-LTFS 3116 | DATA 3118 | PE 3120

GREEN FIELD PPDU: EHT-STF 3122 | EHT-LTF 3124 | U-SIG 1 3126 | U-SIG 2 3128 | EHT-SIG 3130 | EHT-LTFS 3132 | DATA 3134 | PE 3136

FIG. 31

```
                                                            ┌─3700
┌──────────────────────────────────────────────────────────────┐
│  GENERATE A PPDU THAT INCLUDES A PREAMBLE PORTION AND A DATA │
│              PORTION THAT INCLUDES FIRST DATA                │
│                           3702                               │
│  ┌─────────────────────────┐    ┌─────────────────────────┐  │
│  │ THE PPDU HAS A MIXED MODE│ OR │ THE PPDU HAS A GREEN FIELD│ │
│  │    PPDU FORMAT 3704     │    │    PPDU FORMAT 3706     │  │
│  └─────────────────────────┘    └─────────────────────────┘  │
└──────────────────────────────┬───────────────────────────────┘
                               ▼
┌──────────────────────────────────────────────────────────────┐
│ TRANSMIT THE PPDU THROUGH A WIRELESS MEDIUM ON A TRANSMISSION │
│   CHANNEL (E.G., USING ONE OR MORE OF THE COMMUNICATION      │
│           RANGE EXTENSION SCHEMES BELOW)                     │
│                           3708                               │
│                                                              │
│ FREQUENCY DOMAIN DUPLICATION FOR DATA:                       │
│ ┌──────────────────────────────────────────────────────────┐ │
│ │ THE TRANSMISSION CHANNEL IS SUBDIVIDED INTO A PLURALITY  │ │
│ │ OF RESOURCE UNITS (RUS) AND THE FIRST DATA IS DUPLICATED │ │
│ │ IN THE DATA PORTION IN A FREQUENCY DOMAIN IN UNITS OF    │ │
│ │                     RUS 3710                             │ │
│ └──────────────────────────────────────────────────────────┘ │
│                                                              │
│ TIME DOMAIN REPETITION FOR DATA:                             │
│ ┌──────────────────────────────────────────────────────────┐ │
│ │  THE FIRST DATA IS REPEATED IN THE DATA PORTION IN A     │ │
│ │                  TIME DOMAIN 3712                        │ │
│ └──────────────────────────────────────────────────────────┘ │
│                                                              │
│ MULTI-CARIER MODULATION FOR DATA:                            │
│ ┌──────────────────────────────────────────────────────────┐ │
│ │  QUAD-CARRIER MODULATION (QCM) OR OCTA-CARRIER           │ │
│ │  MODULATION (OCM) IS APPLIED TO THE DATA PORTION 3714    │ │
│ └──────────────────────────────────────────────────────────┘ │
│                                                              │
│ FREQUENCY DOMAIN DUPLICATION FOR PREAMBLE:                   │
│ ┌──────────────────────────────────────────────────────────┐ │
│ │ ONE OR MORE PREAMBLE FIELDS ARE DUPLICATED IN THE        │ │
│ │ PREAMBLE PORTION IN A FREQUENCY DOMAIN (E.G., IN UNITS   │ │
│ │                  OF 20 MHZ) 3716                         │ │
│ └──────────────────────────────────────────────────────────┘ │
│                                                              │
│ TIME DOMAIN REPETITION FOR PREAMBLE:                         │
│ ┌──────────────────────────────────────────────────────────┐ │
│ │ ONE OR MORE PREAMBLE FIELDS ARE REPEATED IN THE PREAMBLE │ │
│ │             PORTION IN A TIME DOMAIN 3718                │ │
│ └──────────────────────────────────────────────────────────┘ │
└──────────────────────────────────────────────────────────────┘
```

FIG. 37

EXTENDING COMMUNICATION RANGE OF WIRELESS DEVICES OPERATING IN A 6 GIGAHERTZ BAND

CROSS-REFERENCE TO RELATED APPLICATION

This application claims the benefit of U.S. Provisional Application No. 63/066,612, filed Aug. 17, 2020, titled, "PPDU FRAME FORMAT FOR NEXT GENERATION WIRELESS LANS," and U.S. Provisional Application No. 63/063,777, filed Aug. 10, 2020, titled "RANGE EXTENSION METHOD AND PACKET STRUCTURE IN ENHANCEMENT OF IEEE 802.11AX OPERATING 6 GHZ BAND," which are hereby incorporated by reference.

TECHNICAL FIELD

The present disclosure generally relates to wireless communications, and more specifically, relates to extending communication range of wireless devices operating in a 6 Gigahertz band.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3A illustrates components of a wireless device configured to transmit data, in accordance with some embodiments of the present disclosure.

FIG. 3B illustrates components of a wireless device configured to receive data, in accordance with some embodiments of the present disclosure.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 8 shows an EHT physical layer protocol data unit (PPDU) format, according to some example embodiments.

FIG. 10 shows EHT and next generation wireless (NGW) green field (GF) PPDU formats, according to some example embodiments.

FIG. 12 shows a table of options for autodetection of EHT PPDU format and NGW PPDU format, according to some example embodiments.

FIG. 31 shows a mixed mode PPDU format and a green field PPDU format, according to some example embodiments.

FIG. 37 shows a method for extending communication range when operating in a 6 Gigahertz (GHz) band of a wireless network, according to some example embodiments.

DETAILED DESCRIPTION

Figure 1:
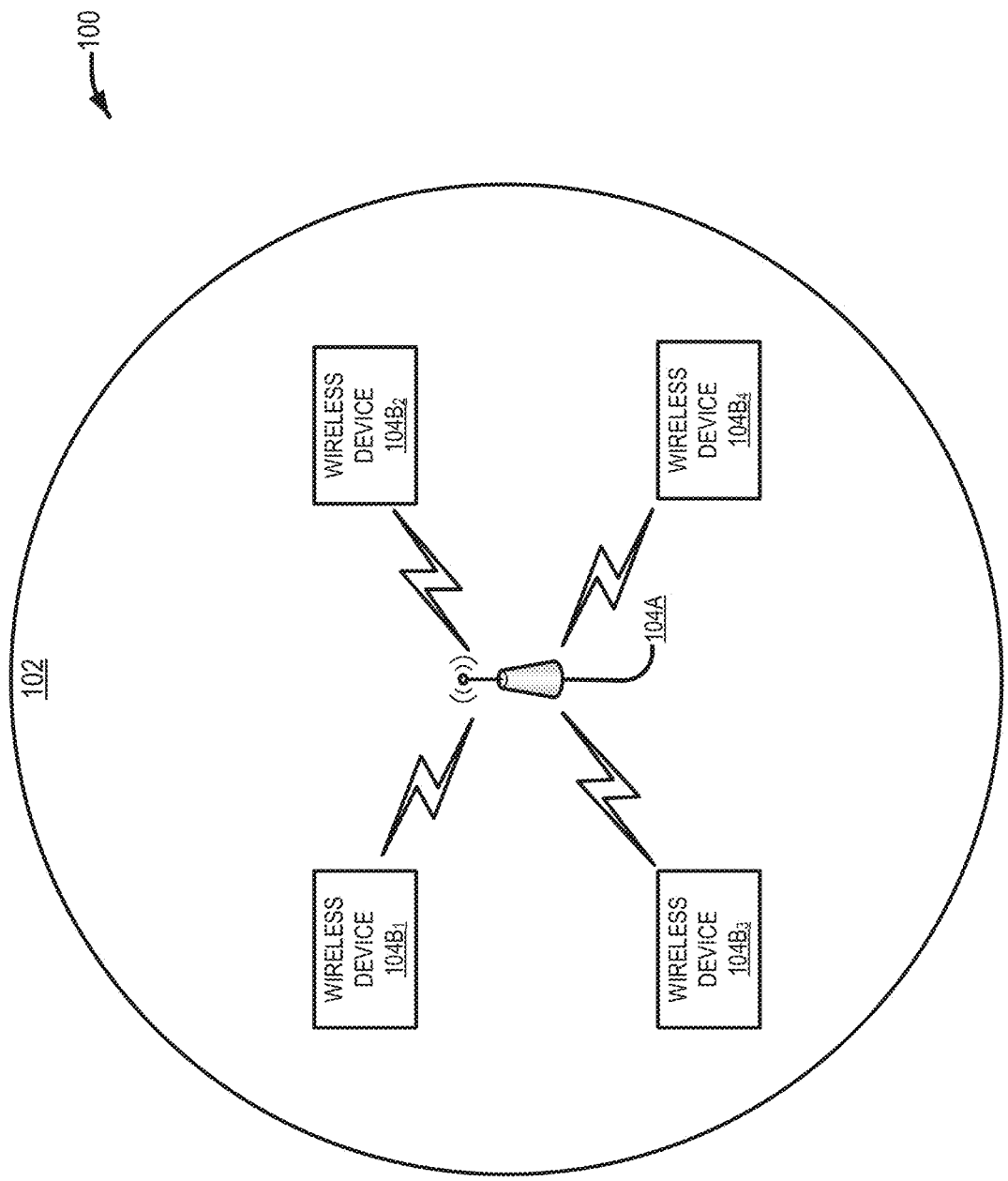
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to extending communication range of a wireless device operating in a 6 Gigahertz (GHz) band.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
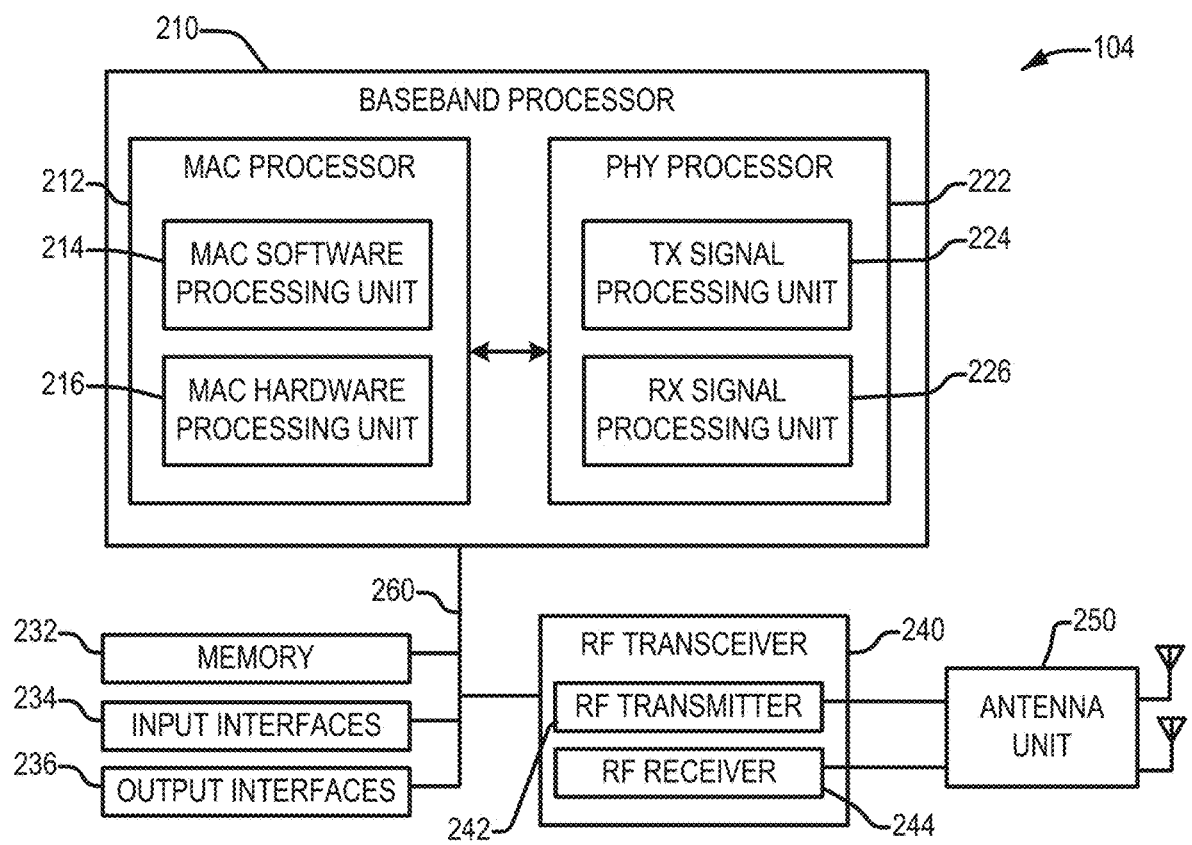
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
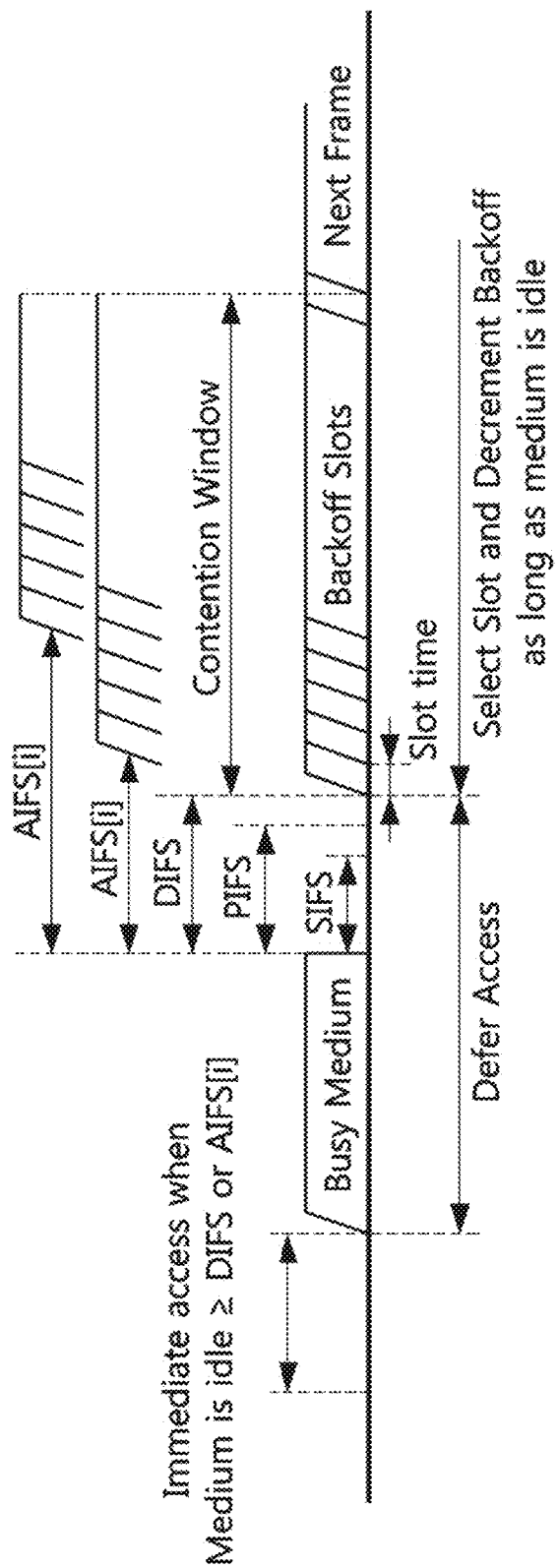
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
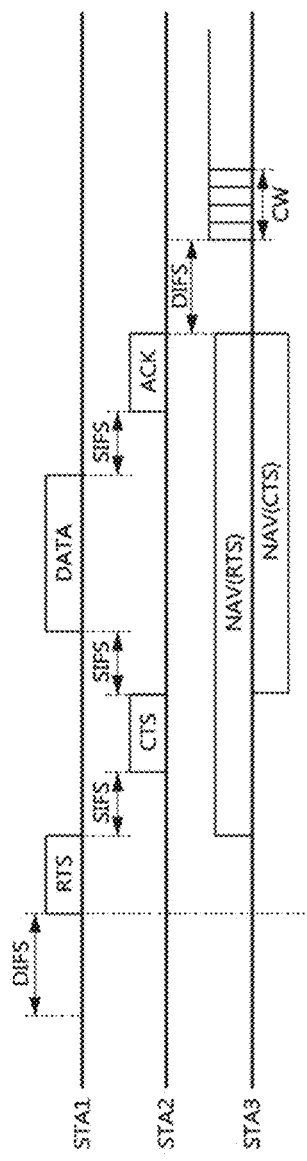
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARD)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink(UL)/downlink(DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

Newer versions of WLAN standards (e.g., IEEE 802.11 standards) are developed while maintaining an inefficient PPDU format to support backwards compatibility with previous WLAN standards. However, EHT wireless devices may operate using a more efficient PPDU format dedicated to the 6 GHz band because the 6 GHz band is a band that has been newly opened for use. However, there may be other wireless devices operating in the 6 GHz band so there is a need for EHT wireless devices to coexist with those other wireless devices and to be able to autodetect different types of PPDU formats. Also, a mechanism to extend the communication range of wireless devices operating in the 6 GHz band is needed because transmission power in the 6 GHz band is lower compared to other frequency bands (e.g., the 2.4 GHz band and 5 GHz band) due to radio wave regulation in the 6 GHz band.

The present disclosure introduces a reduced PPDU format called a "green field" PPDU format that is effective for short distance data transmission. Also, the present disclosure introduces various techniques that can be used to extend communication range (e.g., when operating in a 6 GHz band). These techniques may include, for example, frequency domain duplication, time domain repetition, and power-boosted preamble.

The IEEE 802.11be standard defines the PPDU format for EHT (extremely high throughput). FIG. 8 shows an EHT PPDU format, according to some example embodiments. As shown in FIG. 8, the EHT PPDU format includes a L-STF field 802, a L-LTF field 804, a L-SIG field 806, a RL-SIG field 808, a U-SIG1 field 810, a U-SIG2 field 812, an EHT-SIG field 814, an EHT-STF field 816, EHT-LTF fields 818, and an EHT-DATA field 820.

In one embodiment, if the length field value (N) of the L-SIG field 806 or RL-SIG field 808 satisfies the condition of mod(N,3)==0, the corresponding PPDU is determined to have an EHT PPDU format. Once the PPDU is determined to have the EHT PPDU format, the PHY ID field of the U-SIG field may be used to determine the specific standard.

Figure 9:
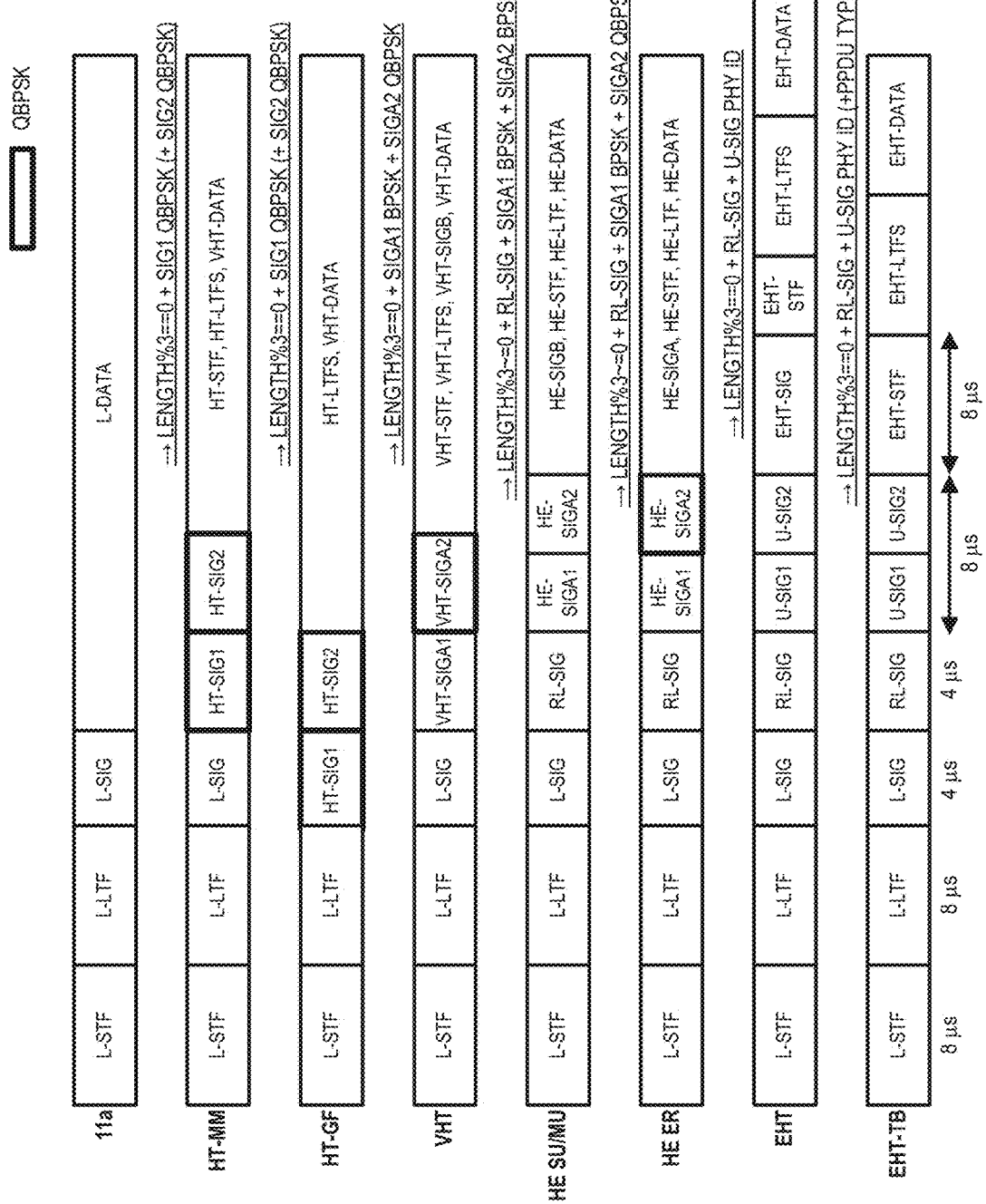
FIG. 9 shows various PPDU formats and the autodetection mechanism for those PPDU formats, according to some example embodiments.

FIG. 9 shows various PPDU formats and the autodetection mechanism for those PPDU formats, according to some example embodiments. In particular, FIG. 9 shows an 11a (IEEE 802.11a) PPDU format, a high throughput (HT, IEEE 802.11n) mixed mode (MM) PPDU format, a very high throughput (VHT, IEEE 802.11ac) PPDU format, a high efficiency (HE, IEEE 802.11ax) single user (SU)/multi user (MU) PPDU format, a HE extended range (ER) PPDU format, an EHT PPDU format, and an EHT trigger-based (TB) PPDU format.

As shown in the figure, the various PPDU formats can be autodetected based on certain conditions being met. For example, as shown in the figure, the HT-MM PPDU format can be autodetected based on the length value (e.g., included in the U-SIG field or RL-SIG field) modulo three being equal to zero (LENGTH %3==0) and SIG1 (e.g., the HT-SIG1 field) being QBPSK modulated (and SIG2 (e.g., the HT-SIG2 field) being QBPSK modulated). The autodetect mechanism for the other PPDU formats shown in the figure can be interpreted in a similar manner.

In one embodiment, to ensure backwards compatibility with the WLAN standards prior to IEEE 802.11be (hereinafter EHT), the L-STF field, L-LTF field, and L-SIG field (i.e., legacy compatible fields) must be included in a PPDU and a legacy device should not access the channel occupied by a new standard terminal during transmission and reception through spoofing when the legacy device receives a PPDU with a new PPDU format. In addition, the new standard terminals should support the new PPDU format.

Since the 6 GHz band is a frequency band that is newly opened for use, efficiency may be improved by defining a reduced PPDU format (also referred to herein as a "green field" (GF) PPDU format) by removing the backwards compatible parts from the EHT PPDU format when the EHT wireless device operates in the 6 GHz band. In addition, the next-generation WLAN (NGW) which will be the standards that come after IEEE 802.11be can also coexist by supporting backwards compatibility for EHT using a reduced PPDU format.

Because IEEE 802.11ax (Wi-Fi 6) wireless devices, which mostly operate in the 5 GHz band, can operate in the 6 GHz band through an extension (e.g., Wi-Fi 6e), it should be taken into consideration that the new PPDU format (the green field PPDU format) may be used together with the existing Wi-Fi 6e in EHT and NGW.

FIG. 10 shows EHT and NGW green field PPDU formats, according to some example embodiments. As shown in FIG. 10, the EHT green field (EHT-GF) PPDU format includes an EHT-STF field 1002, an EHT-LTF field 1004, a U-SIG1 field 1006, a U-SIG2 field 1008, and other fields 1010 such as EHT-SIG fields, EHT-LTF fields, and an EHT-DATA field. Unlike previous PPDU formats, the EHT-GF PPDU format starts with an EHT-STF field 1002 and an EHT-LTF field 1004 without any backwards compatible fields (i.e., there are no legacy preamble fields). The EHT-LTF field 1004 may be used in a form where the first LTF symbol to support MIMO is repeated twice. Also, the EHT-LTF fields following the U-SIG field (U-SIG1 field 1006 and U-SIG2 field 1008) may be transmitted by attaching LTF fields from the second LTF to the n-th LTF (where n is the number of LTF fields for MIMO channel estimation supporting multiple spatial streams).

The U-SIG (universal signal field) field may include a PHY version identifier field (hereinafter PHY ID field), a PPDU Type field, UL/DL Flag field, a BSS Color field, a TXOP Duration field, a Bandwidth field, a Puncturing Channel Information field, an EHT-SIG MCS field (for MU), a Number of EHT SIG symbols field, a GI+EHT-LTF Size field, a Number of EHT-LTF Symbols field, and field(s) for packet extension (PE) related parameters. In one embodiment, the U-SIG field has a length of 2 symbols.

Also, as shown in FIG. 10, similar to the EHT-GF PPDU format, the NGW green field (NGW-GF) PPDU format includes a NGW-STF field 1022, a NGW-LTF field 1024, a U-SIG1 field 1026, a U-SIG2 field 1028, and other fields 1030 such as NGW-SIG fields, NGW-LTF fields, and a NGW-DATA field. These fields may be similar to the corresponding EHT fields but are meant for the NGW standard instead of the EHT standard.

Figure 11:
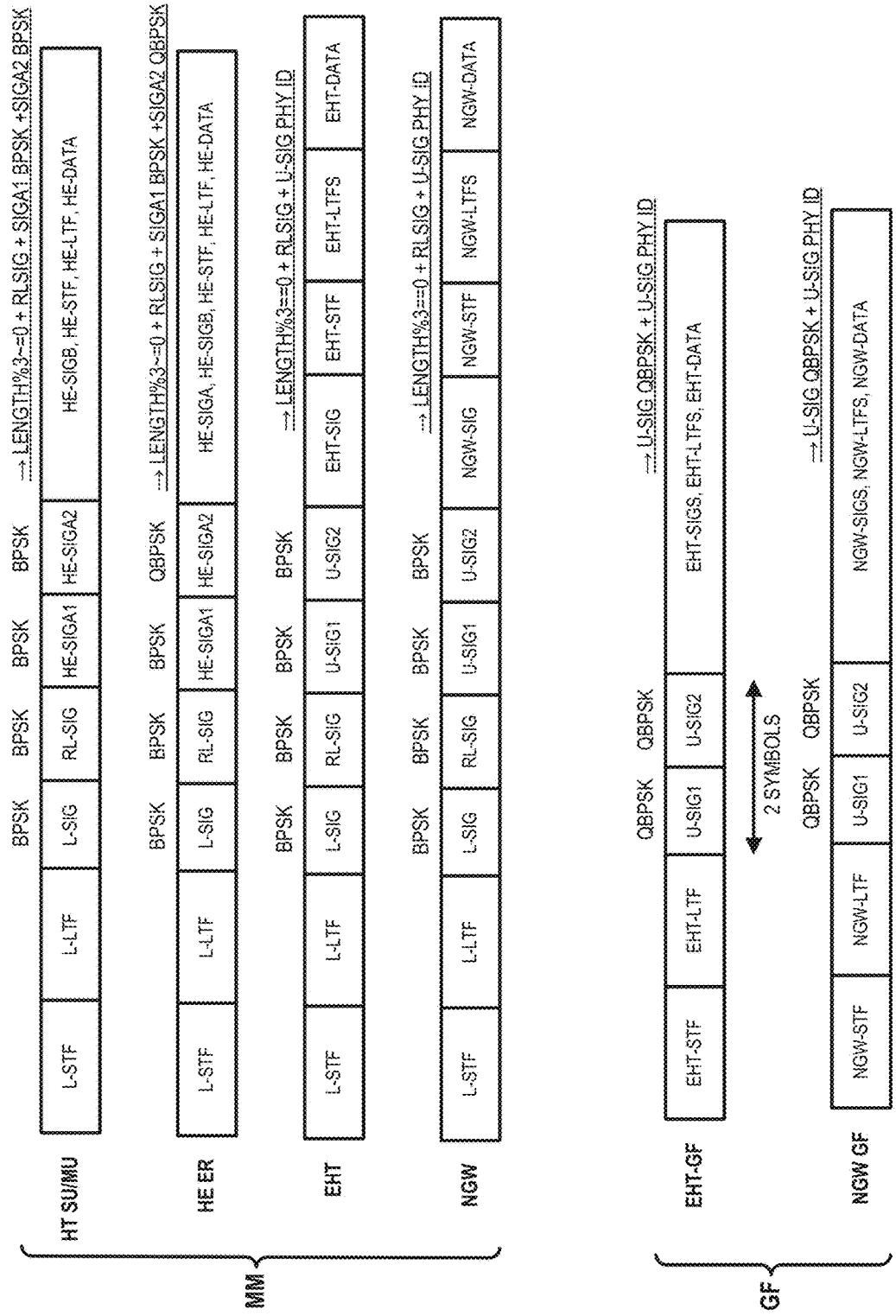
FIG. 11 shows various mixed mode PPDU formats and green field PPDU formats, and the autodetection mechanism for those PPDU formats, according to some example embodiments.

FIG. 11 shows various mixed mode PPDU formats and green field PPDU formats, and the autodetection mechanism for those PPDU formats, according to some example embodiments. The mixed mode (MM) PPDU formats include a L-STF field, a L-LTF field, and a L-SIG field (legacy compatible fields). In mixed mode PPDU formats, the RL-SIG field, which is a repeatedly transmitted L-SIG field, may be transmitted using binary phase shift keying (BPSK) modulation. In one embodiment, if the L-SIG field meets the condition of length modulo three is not equal to zero (length %3~=0), then the corresponding PPDU is determined as having a mixed mode HE PPDU format. In one embodiment, if length modulo three is equal to 1 (length %3==1), then the corresponding PPDU is determined as having a HE SU PPDU format or HE TB PPDU format, wherein there is signal field information to indicate whether the PPDU has a HE SU PPDU format or HE TB PPDU format. In one embodiment, if length modulo three is equal to two (length %3==2), the corresponding PPDU is determined as having a HE MU PPDU format or HE SU ER PPDU format, wherein if the HE-SIGA2 field, which is the fourth signal field symbol, is quadrature binary phase-shift keying (QBPSK) modulated, it is determined as having HE ER (Extended Range) PPDU format and if it is BPSK modulated, it is determined as having a HE MU PPDU format. In one embodiment, if L-SIG length modulo three is equal to zero (length %3==0) and there is a repeated transmission to RL-SIG field, the version can be determined to be a version after EHT including EHT. In one embodiment, EHT and NGW versions can be distinguished by using the PHY ID field of the U-SIG field. In one embodiment, it is possible to indicate an EHT PPDU type such as EHT TB PPDU by using the PPDU Type field of the U-SIG field.

Also, as shown in FIG. 11, the EHT green field (EHT-GF) PPDU format may start with an EHT-STF field (e.g., 8 μs) and an EHT-LTF field (e.g., 8 μs including guard interval (GI)) without a legacy compatible part and the NGW green field (NGW-GF) PPDU format may start with a NGW-STF field (8 μs) and a NGW-LTF field (8 μs including GI). In one embodiment, the 8 μs EHT-LTF OFDM symbol consists of 1.6 μs GI and 6.4 μs 2×LTF. In one embodiment, the 8 μs EHT-LTF OFDM symbol consists of 1.6 μs GI and two 3.2 μs 1×LTF. Here 1.6 μs GI could consist of two 0.8 μs GIs. The U-SIG field may have 4 μs symbol length. In one embodiment, the EHT-LTF fields that come after the U-SIG field have 1× (3.2 μs symbol duration without GI), 2× (6.4 μs symbol duration without GI), or 4× (12.8 μs symbol duration without GI) length and power boosting and/or OFDM symbol repetition can be applied to the EHT-"TF fields that come after the U-SIG field to improve channel estimation accuracy and throughput.

In one embodiment, autodetection of the green field PPDU format is performed as follows. If the first symbol in a signal field of a PPDU is BPSK modulated, the PPDU is determined to have a mixed mode PPDU format (e.g., HE, EHT or NGW mixed mode PPDU format) and if the first symbol in the signal field of the PPDU is QBPSK modulated, the PPDU is determined to have a green field PPDU format (e.g., EHT-GF PPDU format or NGW-GF PPDU format). The PHY ID field of the U-SIG field can be used to distinguish between the EHT PPDU format and NGW PPDU format (e.g., which version of NGW).

In one embodiment, the EHT PPDU format and NGW PPDU format can be distinguished using one of the options shown in the table shown in FIG. 12. In this table, NGWn refers to next-generation WLAN standard n, where n is an index referring to a particular standard. The table shows three options for autodetection of EHT PPDU format and NGW PPDU format. In option 1, both the EHT PPDU format and the NGW PPDU format have a first and second symbol (of the U-SIG field) that is QBPSK modulated, and the PHY ID field (e.g., of the U-SIG field) is used to distinguish between the EHT PPDU format and the NGW PPDU format. For example, a PHY ID value of zero may indicate EHT while a PHY ID value of n (where n is greater than zero) may indicate NGWn. In option 2, if the PPDU has a first symbol that is QBPSK modulated and a second symbol that is BPSK modulated, then the PPDU is determined to have an EHT PPDU format (the PHY ID value does not matter in this case but may be set to zero). Otherwise, if the PPDU has first and second symbols that are QBPSK modulated, then the PPDU is determined to have a NGW PPDU format, and the PHY ID value may indicate the particular version of NGW. In option 3, if the PPDU has first and second symbols that are QBPSK modulated, then the PPDU is determined to have an EHT PPDU format (the PHY ID value does not matter in this case but may be set to zero). Otherwise, if the PPDU has a first symbol that is QBPSK modulated and a second symbol that is BPSK modulated, then the PPDU is determined to have a NGW PPDU format, and the PHY ID value may indicate the particular version of NGW.

In one embodiment, the preamble length of green field PPDU formats (e.g., EHT-GF PPDU format and NGW-GF PPDU format) is the same as the preamble length of MM PPDU formats for purposes of coexistence and autodetection in the 6 GHz band. Autodetection of mixed mode PPDU format and green field PPDU format works well because the signal field starts after the STF field and the LTF field of the same length in both mixed mode and greenfield PPDU formats. However, the preamble length may be different if the preamble is repeatedly transmitted to extend the communication range. Also, the length of the EHT-STF field in the SU/MU PPDU format may be 4 μs in the mixed mode PPDU format, but it may be 8 μs in the green field PPDU format. In one embodiment, the length of the EHT-STF field is 8 μs in both mixed mode and green field PPDU formats.

EHT and NGW devices may configure a protection function that determines whether a PPDU has the green field PPDU format and does not allow channel access during green field mode transmission as mandatory or it can configure transmission as optional. Also, it is possible to use the green field mode as mandatory for both transmission and reception in EHT and NGW because the 6 GHz band is a newly opened channel in EHT.

Figure 13:
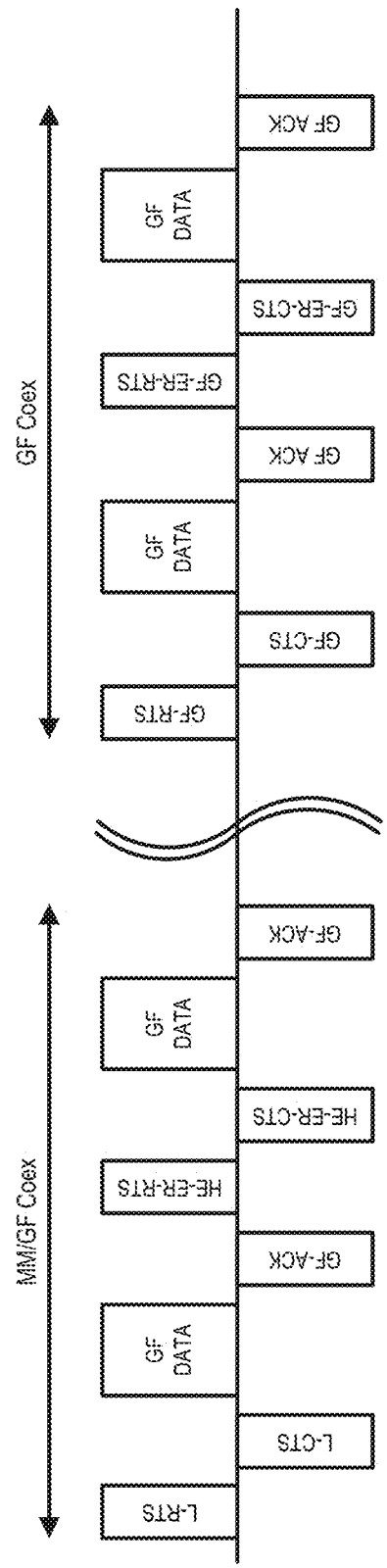
FIG. 13 shows green field protection using legacy format request-to-send/clear-to-send (RTS/CTS) or GF-RTS/CTS, according to some example embodiments.

FIG. 13 shows green field protection using legacy format RTS/CTS or GF-RTS/CTS, according to some example embodiments. The methodology by which devices using mixed mode PPDU format and green field PPDU format can coexist in a wireless network is described below. In one embodiment, the green field PPDU format can be used in a wireless network with only EHT and NGW devices. However, if a Wi-Fi 6e device is used together or is likely to be used, the device may protect the green field mode transmission. For example, as shown in FIG. 13, a wireless device may transmit the legacy format RTS/CTS (e.g., L-RTS and C-RTS) or HE format RTS/CTS (including ER format) (e.g., HE-ER-RTS and HE-ER-CTS) to prevent a nearby mixed mode device or green field device from accessing the channel during green field PPDU transmission. Also, in one embodiment, protection is provided by transmitting green field RTS/CTS (including ER format) (e.g., GF-ER-RTS and GF-ER-CTS) for protection between terminals that support the green field mode.

Figure 14:
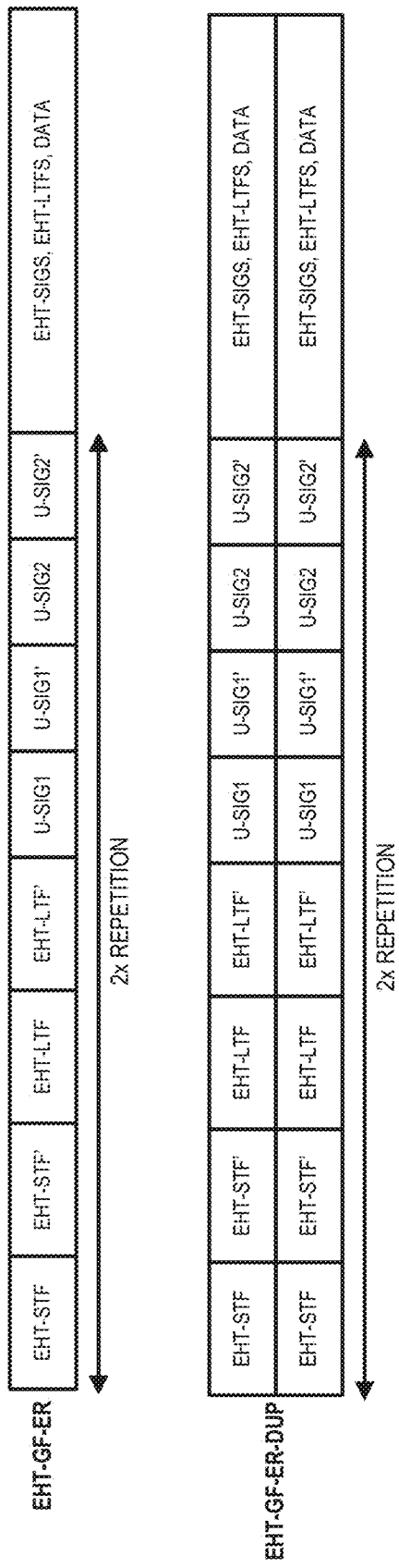
FIG. 14 shows possible EHT GF extended range (ER) PPDU formats, according to some example embodiments.

In one embodiment, to improve communication range, an ER PPDU format can be used. FIG. 14 shows possible EHT GF ER PPDU formats, according to some example embodiments. In FIG. 14, GF-ER refers to greenfield extended range and GF-ER-DUP refers to greenfield extended range duplicated. As shown in FIG. 14, the GF-ER PPDU format improves the communication range of a signal by repeating the transmission of the EHT-STF field, EHT-LTF field, and U-SIG field (which includes the U-SIG1 field and the U-SIG2 field) twice (2× repetition) (in the figure EHT-STF' is a repetition of EHT-STF, EHT-LTF' is a repetition of EHT-LTF, U-SIG1' is a repetition of SIG-1, and U-SIG2' is a repetition of U-SIG2). Also, as shown in FIG. 14, the GF-ER-DUP PPDU format improves the communication range of a signal by duplicating transmission of the fields of the GF-ER PPDU format in the frequency domain.

Figure 15:
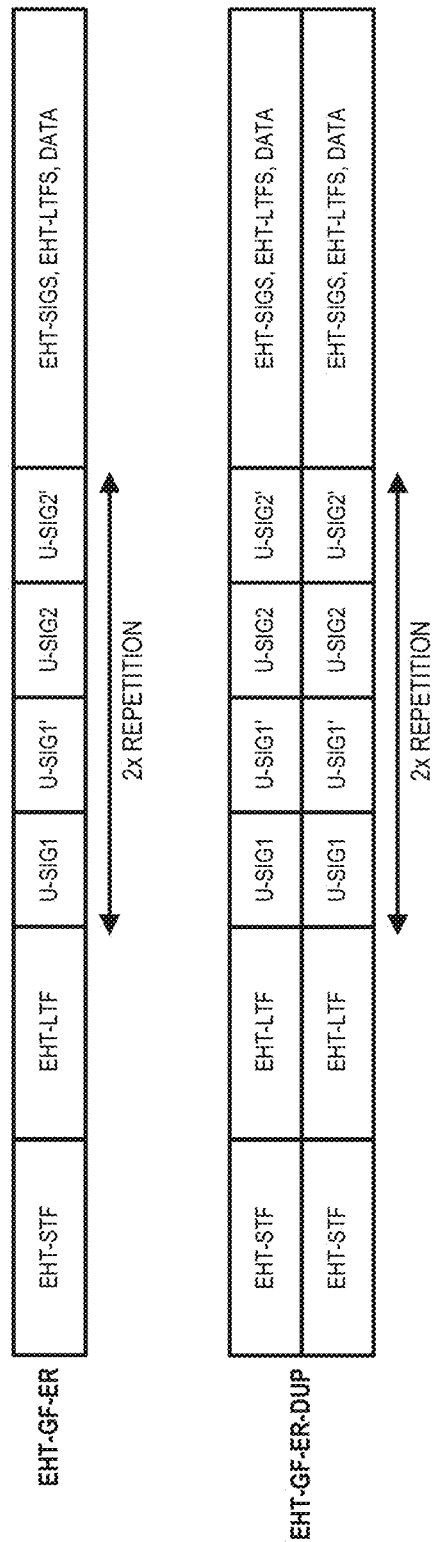
FIG. 15 shows other possible EHT GF ER PPDU formats, according to some example embodiments.

FIG. 15 shows other possible EHT GF ER PPDU formats, according to some example embodiments. The ER PPDU formats shown in FIG. 15 (EHT-GF-ER and EHT-GF-ER-DUP PPDU formats) are ones where the EHT-STF field and the EHT-LTF field are not repeatedly transmitted but the signal field is repeatedly transmitted.

Figure 16:
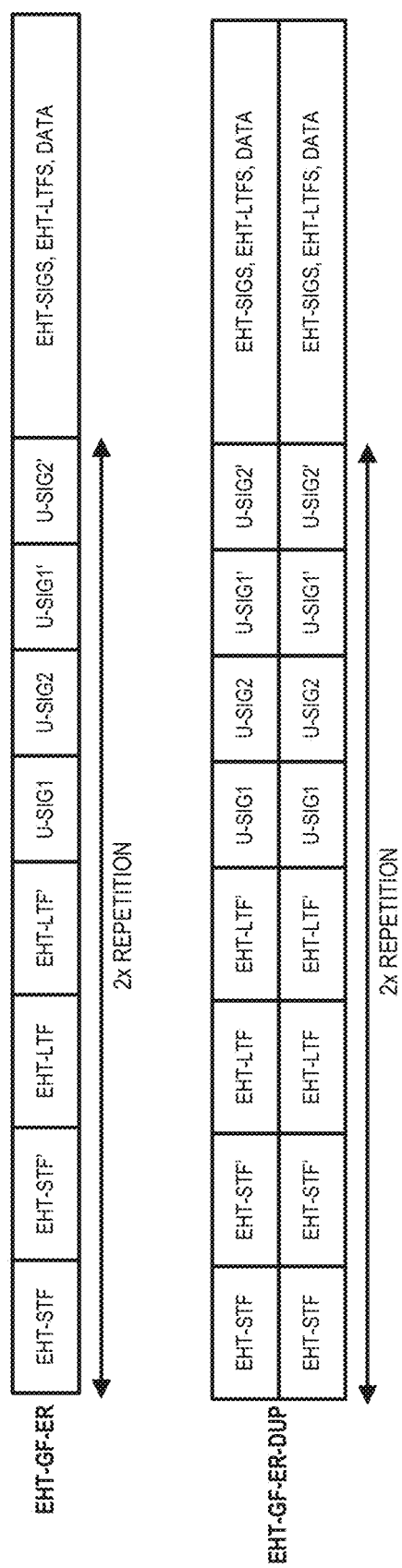
FIG. 16 shows other possible EHT GF ER PPDU formats, according to some example embodiments.

FIG. 16 shows other possible EHT GF ER PPDU formats, according to some example embodiments. While the EHT-GF-ER PPDU format shown in FIG. 14 transmits U-SIG1, U-SIG1', U-SIG2, and U-SIG2' in sequence, the EHT-GF-ER PPDU format shown in FIG. 16 transmits U-SIG1, U-SIG2, U-SIG1', and U-SIG2' in sequence. Also, as shown in FIG. 16, the EHT-GF-ER-DUP PPDU format improves the communication range of a signal by duplicating transmission of the fields of the EHT-GF-ER PPDU format in the frequency domain.

Figure 17:
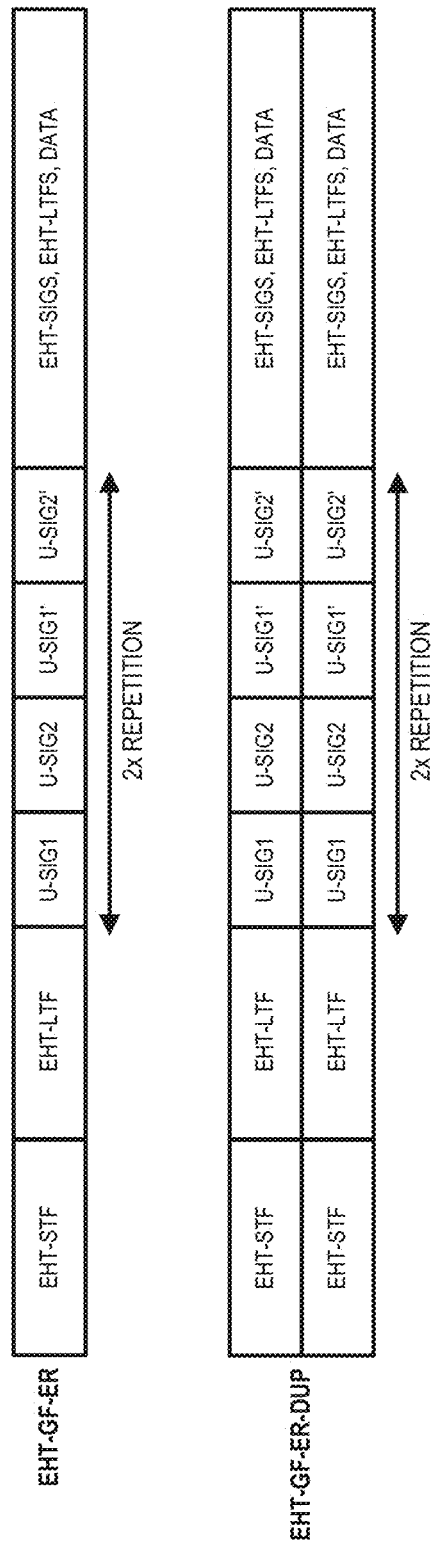
FIG. 17 shows other possible EHT GF ER PPDU formats, according to some example embodiments.

FIG. 17 shows other possible EHT GF ER PPDU formats, according to some example embodiments. The EHT-GF-ER PPDU format shown in FIG. 17 is one where the EHT-STF field and the EHT-LTF field are not repeatedly transmitted but the signal field is transmitted twice (U-SIG1, U-SIG2, U-SIG1', and U-SIG2' transmitted in sequence). Also, as shown in FIG. 17, the EHT-GF-ER-DUP PPDU format improves the communication range of a signal by duplicating transmission of the fields of the EHT-GF-ER PPDU format in the frequency domain.

In one embodiment, with the PPDU formats shown in FIGS. 14-17, the rest of PPDU except the preamble portion (e.g., the DATA field) is transmitted in dual carrier modulation (DCM) or a low modulation coding scheme (MCS). In one embodiment, this portion can be repeatedly transmitted to ensure the same or similar communication range as the preamble portion.

Figure 18:
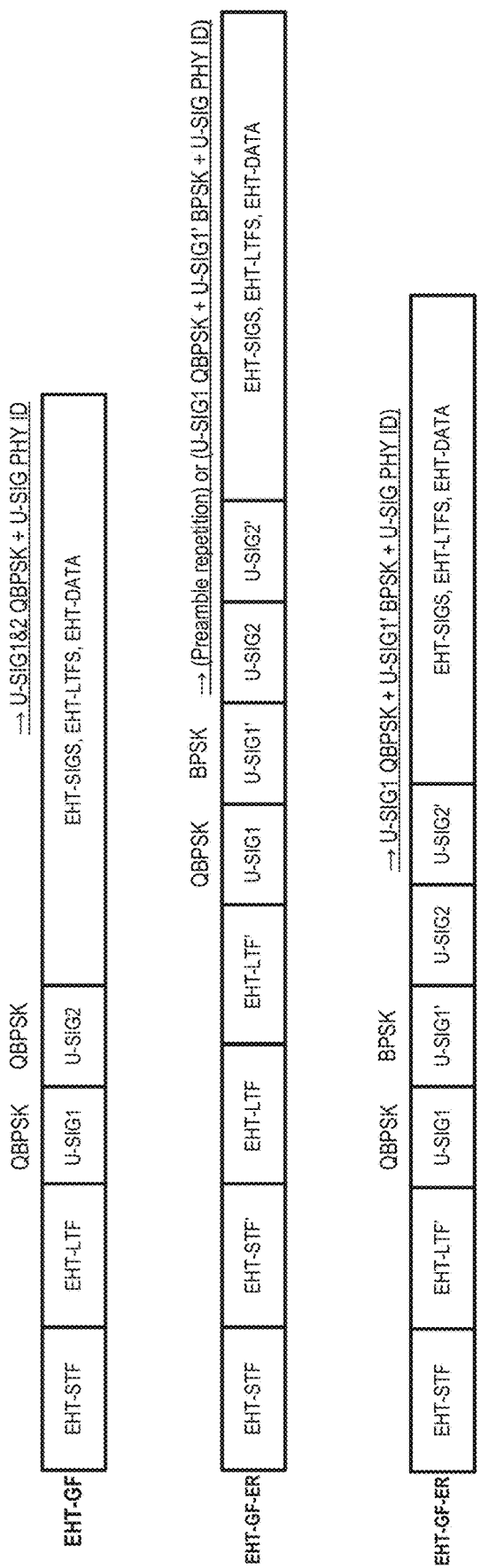
FIG. 18 shows ER PPDU formats and autodetection mechanisms for those formats, according to some example embodiments.

FIG. 18 shows ER PPDU formats and autodetection mechanisms for those formats, according to some example embodiments. In one embodiment, a PPDU is determined to have a green field PPDU format if the first signal field symbol is modulated in QBPSK. In one embodiment, a PPDU is determined to have a mixed mode PPDU format if the first signal field symbol is modulated in BPSK. In one embodiment, a PPDU is determined to have a non-ER PPDU format if the second signal field symbol is modulated in QBPSK and the PPDU is determined to have an ER PPDU format if second signal field symbol is modulated in BPSK. In one embodiment, the EHT-GF-ER PPDU format, which has a long preamble, can be autodetected even with preamble repetition. Using this implicit way, when receiving a PPDU having an EHT-GF-ER PPDU format, a device can expect some portion (e.g. U-SIG field or DATA field) of this PPDU is repeated. The ER PPDU format autodetection mechanisms shown in FIG. 18 may also be applied to the PPDU formats shown in FIGS. 14-17.

As shown in FIG. 18, if both the U-SIG1 field and U-SIG2 field are QBPSK modulated and the U-SIG PHY ID value indicates EHT, then the corresponding PPDU is determines as having an EHT-GF PPDU format. If there is preamble repetition or if the U-SIG1 field is QBPSK modulated, the U-SIG' field is BPSK modulated, and the U-SIG PHY ID value indicates EHT, then the corresponding PPDU is determined as having an EHT-GF-ER PPDU format. If the U-SIG1 field is QBPSK modulated, the U-SIG' field is BPSK modulated, and the U-SIG PHY ID value indicates EHT, then the corresponding PPDU is determined as having an EHT-GF-ER PPDU format.

Figure 19:
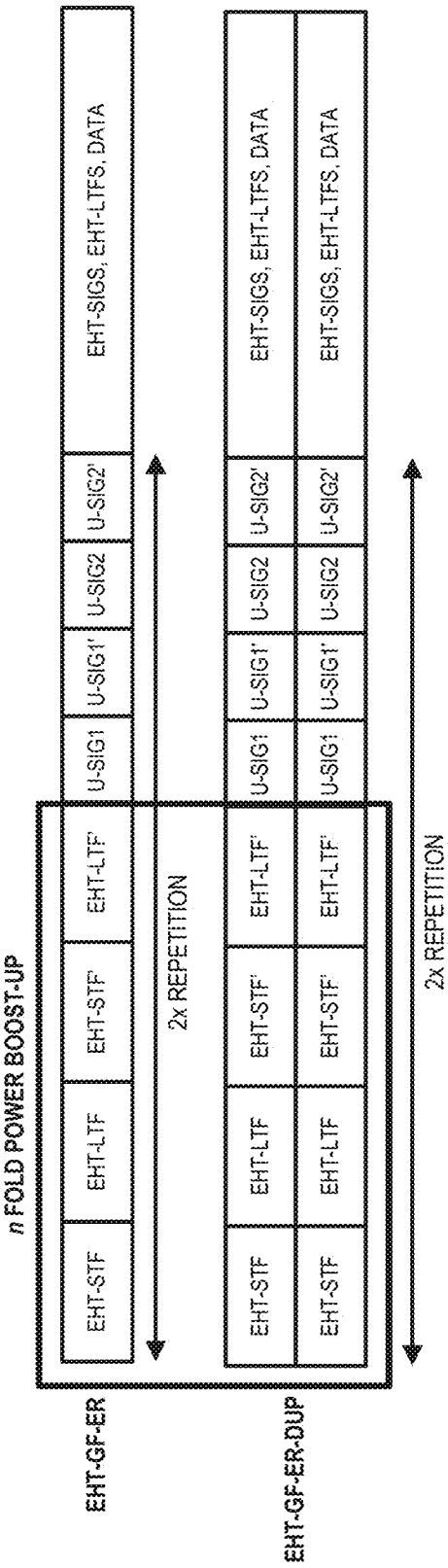
FIG. 19 shows an ER PPDU format with boosting of the preamble transmission power, according to some example embodiments.
Figure 20:
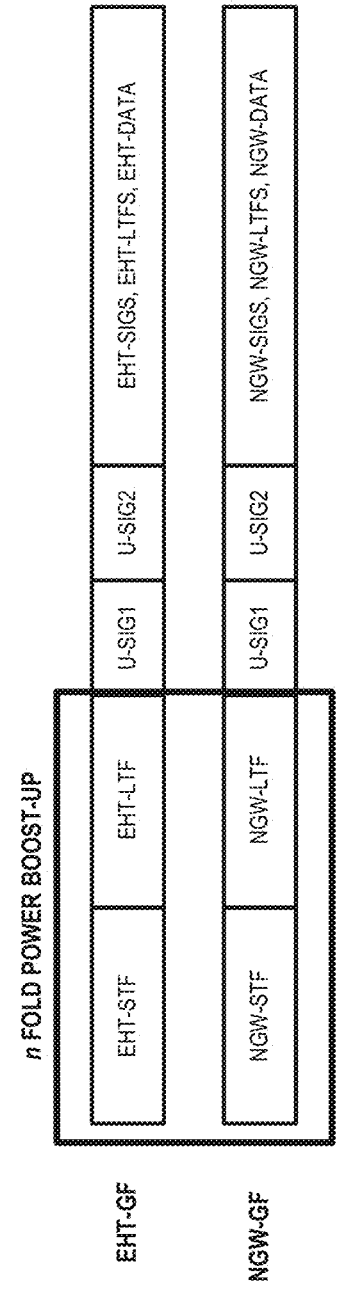
FIG. 20 shows an ER PPDU format with boosting of the preamble transmission power without repeated transmission of the EHT-STF field and EHT-LTF field, according to some example embodiments.

FIG. 19 shows an ER PPDU format with boosting of the preamble transmission power, according to some example embodiments. As shown in FIG. 19, the EHT-STF field and EHT-LTF field can be transmitted with n times power boost-up with repeated (e.g., 2× repetition) transmission in the time domain. Also, as shown in FIG. 20, transmission with n times power boost-up can be applied without repeated transmission of the EHT-STF field and EHT-LTF field. The power boost-up transmission schemes shown in FIG. 19 and FIG. 20 may also be applied to the PPDU formats shown in FIGS. 14-17.

Figure 21:
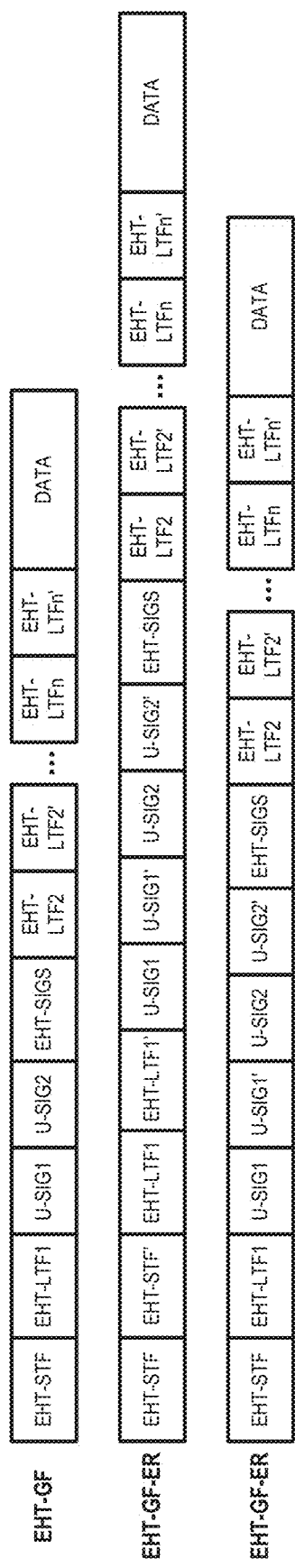
FIG. 21 shows ER PPDU formats with repeated transmission of EHT-LTF fields, according to some example embodiments.

In one embodiment, to extend communication range, one or more of the EHT-SIG field, EHT-LTF field, and DATA field coming after the U-SIG field is repeatedly transmitted n times. For repeated transmission, the same signal may be repeated in a time domain and/or a frequency domain. Additionally or alternatively, it may be transmitted using a low MCS. In one embodiment, repeated transmission may be applied to the ER PPDU format. In the repeated transmission, the number or length of a symbol transmitted after the U-SIG field can be indicated in the U-SIG field or the EHT-SIG field. For example, each of the EHT-LTF2 field to EHT-LTFn fields is transmitted twice (as shown in FIG. 21) and the number of repetitions or length information may be indicated in the U-SIG field. The indication of repetitive transmission, its number and length of U-SIG field can be determined by the repetition pattern of the preamble or the U-SIG field phase modulation difference shown in FIG. 18 as one example.

In one embodiment, the generation of the time domain symbol of a 1×EHE-LTF (or corresponding midamble) is equivalent to modulating every 4 subcarriers in an OFDM symbol of 4×EHT-LTF (e.g., 12.8 μs excluding GI), and then transmitting only the first one fourth (¼) of the OFDM symbol in the time domain. In one embodiment, the generation of the time domain symbol of a 2× HE-LTF is equivalent to modulating every other subcarrier in an OFDM symbol of 4×EHT-LTF (e.g., 12.8 μs excluding GI), and then transmitting only the first half (½) of the OFDM symbol in the time domain.

In one embodiment, the MCS field and/or DCM field is used to indicate a PPDU having an extended range format. The MCS field and/or DCM field may be in the EHT-SIG field. Considering that a lower MCS is proper to support a robust PPDU format, MCSO and DCM enabled may implicitly indicate the extended range PPDU format in case any types of duplication is applied to the data portion.

Various green field PPDU formats and ER PPDU formats have been described herein. The green field PPDU format described herein may be effective for short distance data transmission. Also, the communication range may be extended by using repeated transmission of the preamble, preamble transmission power boost-up, and/or frequency domain duplication.

Because the maximum allowed transmission power in the 6 GHz band, which has been recently opened for indoor communications, is lower than that in the 5 GHz band, the communication range of the 6 GHz band is also shorter than that of the 5 GHz band. To achieve comparable communication range in the 6 GHz band, a new MCS is needed. Also, a new green field PPDU format can be defined without considering backwards compatibility with the legacy standards. Thus, embodiments may introduce a new MCS to extend communication range for 6 GHz operations and introduce a green field PPDU format for use in the 6 GHz band.

Embodiments provide a mechanism to extend the communication range of a wireless device in when operating in the 6 GHz band. New techniques are introduced herein to support communication range extension. Because the 6 GHz band is a new band which has been recently opened for use, legacy wireless devices are not expected to operate in this band. Thus, backwards compatibility with the legacy standard may not need to be considered when designing the new PPDU format, which allows for the designing of more efficient PPDU formats.

Figure 22:
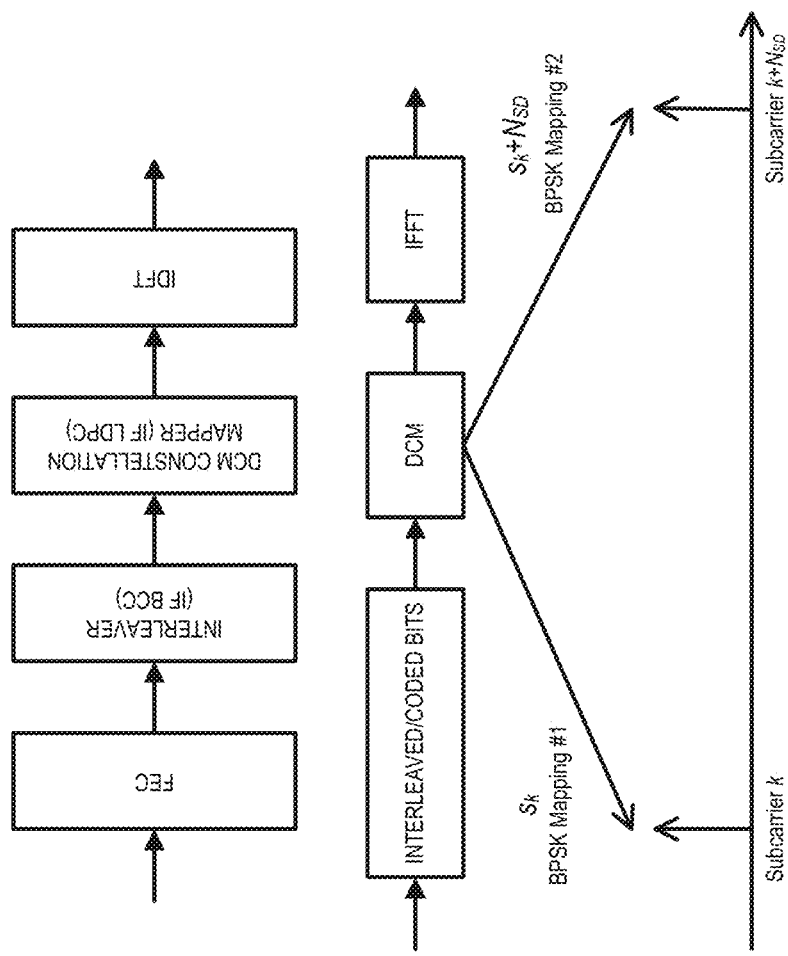
FIG. 22 shows dual carrier modulation (DCM) operations, according to some example embodiments.

The power spectral density (PSD) requirement in the 6 GHz low power indoor (LPI) band is more stringent than the PSD requirement in the 2.4 GHz and 5 GHz bands. Thus, the 6 GHz LPI band has a shorter communication range compared to the 5 GHz band. Thus, to provide similar communication range in both the 5 GHz band and 6 GHz band, a new mechanism which can provide lower receiver sensitivity level is described herein. In IEEE 802.11ax, dual-carrier modulation (DCM) is employed to extend communication range. FIG. 22 shows DCM operations, according to some example embodiments. As shown in FIG. 22, in DCM, the same information bit is transmitted in two different subcarriers in an OFDM symbol. For example, $S_k$ and $S_{k+N_{SD}}$ are modulated symbols for data tone k and k+$N_{SD}$ in DCM feature, wherein $S_k$ and $S_{k+N_{SD}}$ are both BPSK modulated and $N_{SD}$ is defined as half of $N_{SD}$ in a non-DCM PPDU. In order to reduce peak-to-average-power ratio (PAPR) of MCSO DCM modulation, the half of modulated symbol may be scrambled with $S_{k+N_{SD}}=S_k e^{j\pi(k+N_{SD})}$. Therefore, three decibel (dB) power gain and frequency diversity gain may be achieved even though the data rate is halved. However, such a DCM may not be enough to sufficiently extend the communication range in the 6 GHz band. Thus, a new transmission scheme to extend communication range (i.e., provide lower receiver sensitivity) in the 6 GHz band is needed.

Various mechanisms to extend communication range of a wireless device are described herein. In the DCM scheme, the total number of data subcarriers are divided into two groups (e.g., upper and lower bands) and the same information bits are allocated to these two groups. In one embodiment, quad-carrier modulation (QCM) or octa-carrier modulation (OCM) can be used to extend communication range. In QCM, the data subcarriers are divided into four groups and the same information bits are assigned to these four subcarrier groups. Although the same information bits are allocated to each subcarrier group, the modulated output (e.g., BPSK, QPSK etc.) may be different. For example, a phase-shift operation can be applied. In one embodiment, input bits to QAM can be shuffled (e.g., have a different bit-stream order). For example, in 16-QAM with four bits, 'b1 b2 b3 b4' may be an input of the first group, 'b2 b1 b3 b4' may be an input of the second group, 'b1 b3 b2 b4' may be an input of the third group, and 'b3 b1 b4 b2' may be an input of the fourth group. Such modification may improve PAPR after OFDM modulation. Other ways of bit shuffling are contemplated as well. A similar approach can be applied to OCM (in OCM, the data subcarriers are divided into eight groups and the same information bits are assigned to these eight subcarrier groups) and further extensions.

Figure 23:
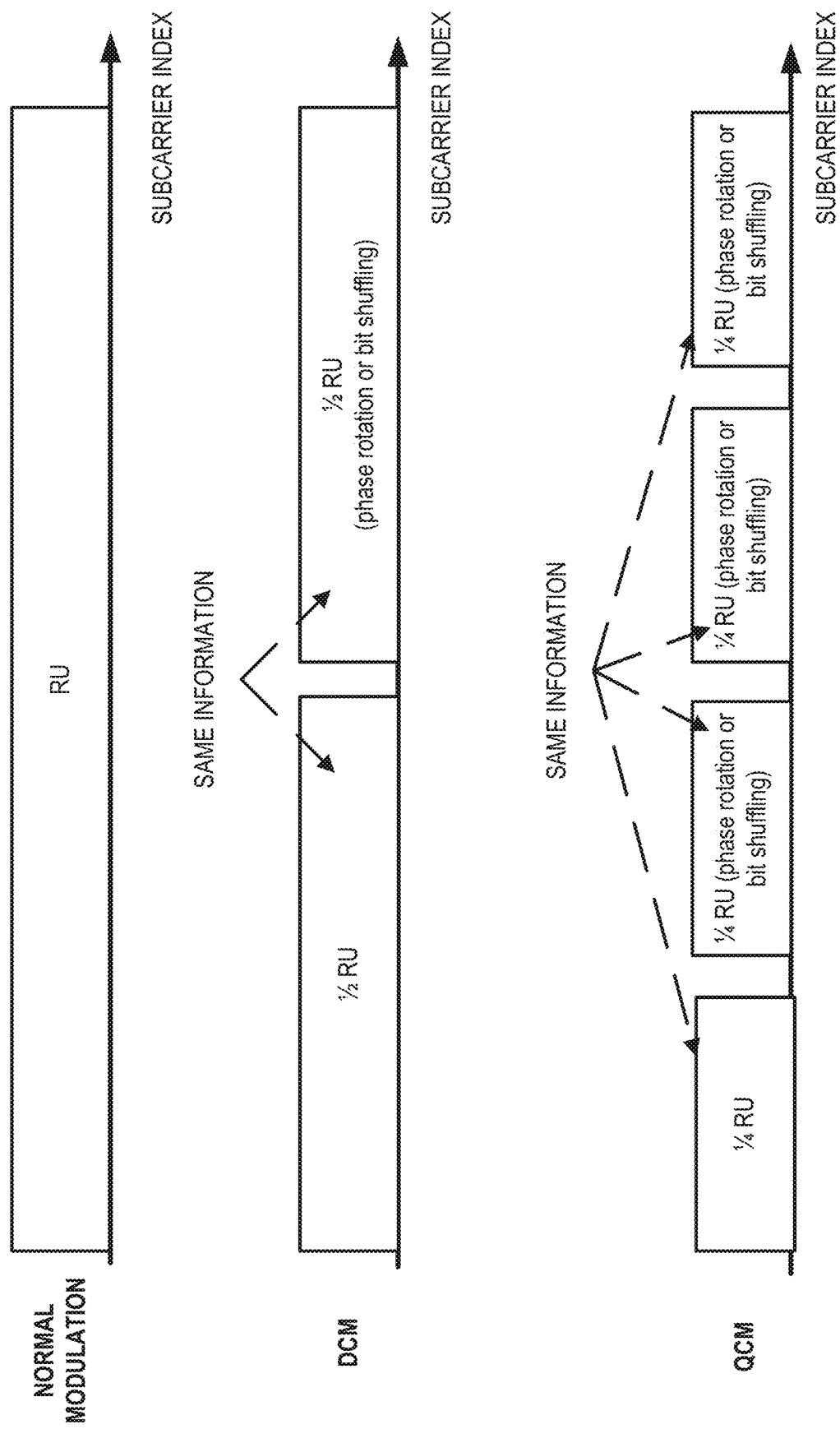
FIG. 23 shows a normal modulation scheme, a DCM scheme, and a quad carrier modulation (QCM) scheme, according to some example embodiments.

FIG. 23 shows a normal modulation scheme, a DCM scheme, and a QCM scheme, according to some example embodiments. As shown in the diagram, the normal modulation scheme includes a RU in which information can be transmitted. As shown in FIG. 23, the DCM scheme is different from the normal modulation scheme in that the RU is subdivided into two RUs (two 1/2 RUs) and the same information is included in each 1/2 RU. Phase rotation or bit shuffling may be applied to one or more of the 1/2 RUs. Also, the QCM scheme is different from the normal modulation scheme in that the RU is subdivided into four RUs (four 1/4 RUs) and the same information is included in each 1/4 RU. Phase rotation or bit shuffling may be applied to one or more of the 1/4 RUs.

Figure 24:
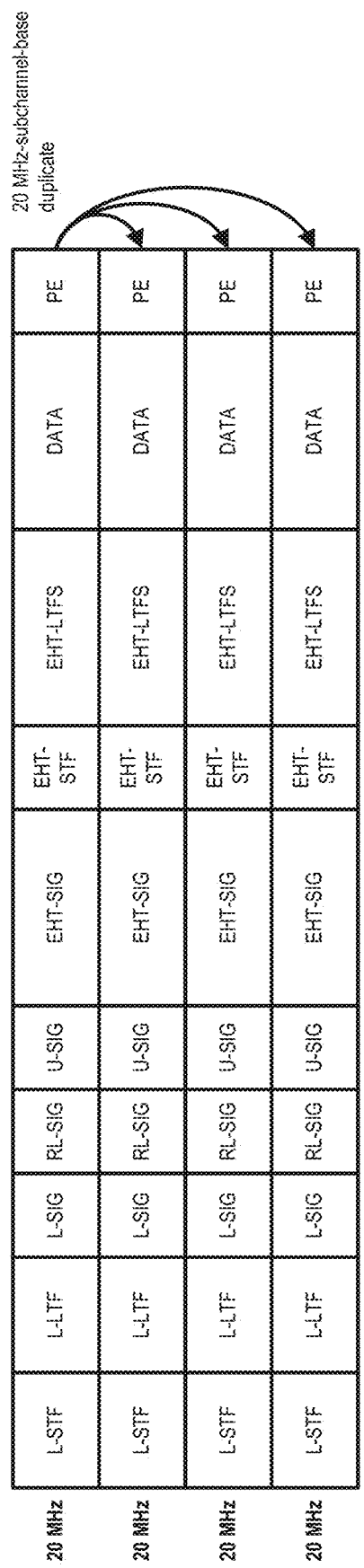
FIG. 24 shows a duplicate PPDU format for Institute of Electrical and Electronics Engineers (IEEE) 802.11be EHT WLAN, according to some example embodiments.

In one embodiment, a duplicate PPDU format can be used to extend communication range. FIG. 24 shows a duplicate PPDU format for IEEE 802.11be EHT WLAN, according to some example embodiments. As shown in FIG. 24, the same structure is duplicated in the frequency domain in units of 20 MHz. In one embodiment, each of the duplicated 20 MHz structures have a different phase shift to reduce PAPR of the whole PPDU (e.g., an 80 MHz PPDU). In one embodiment, the previously mentioned multi-carrier modulation (e.g., DCM, QCM, OCM, etc.) is applied to the data portion (indicated as "DATA" in the figure) to further extend the communication range.

As mentioned above, in the duplicate PPDU format shown in FIG. 24, the same structure is duplicated in units of 20 MHz. In one embodiment, data included in the PPDU can be duplicated in units of RUs (referred to herein as "RU-based duplication"). The RU size may be 26-tone RU, 52-tone RU, 106-tone RU, 242-tone RU, 484-tone RU, 996-tone RU, or 2×996-tone RU. In one embodiment, the preamble portion of the PPDU is duplicated in units of 20 MHz subchannels while the data portion of the PPDU is duplicated in units of RUs. For example, the EHT-STF field and/or EHT-LTF fields may cover the entire bandwidth without duplication. When the proposed RU-based duplication is applied, the communication range may be extended (i.e., obtain lower receiver sensitivity level) without applying QCM or OCM. For example, a combination of applying DCM and RU-based duplication may achieve similar communication range (receiver sensitivity level) to QCM without any frequency domain duplication.

Figure 25:
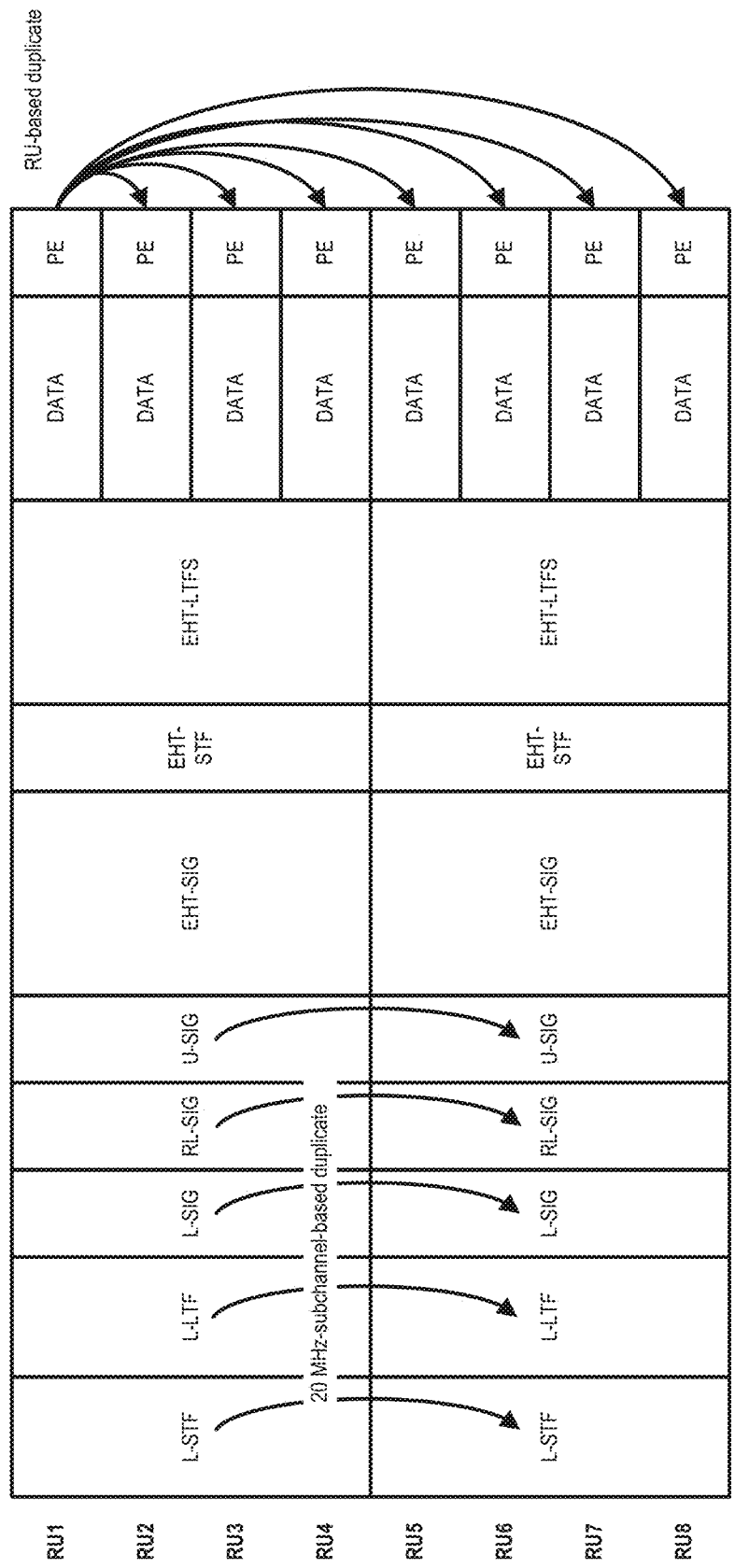
FIG. 25 shows a PPDU format with frequency domain duplication, according to some example embodiments.
Figure 26:
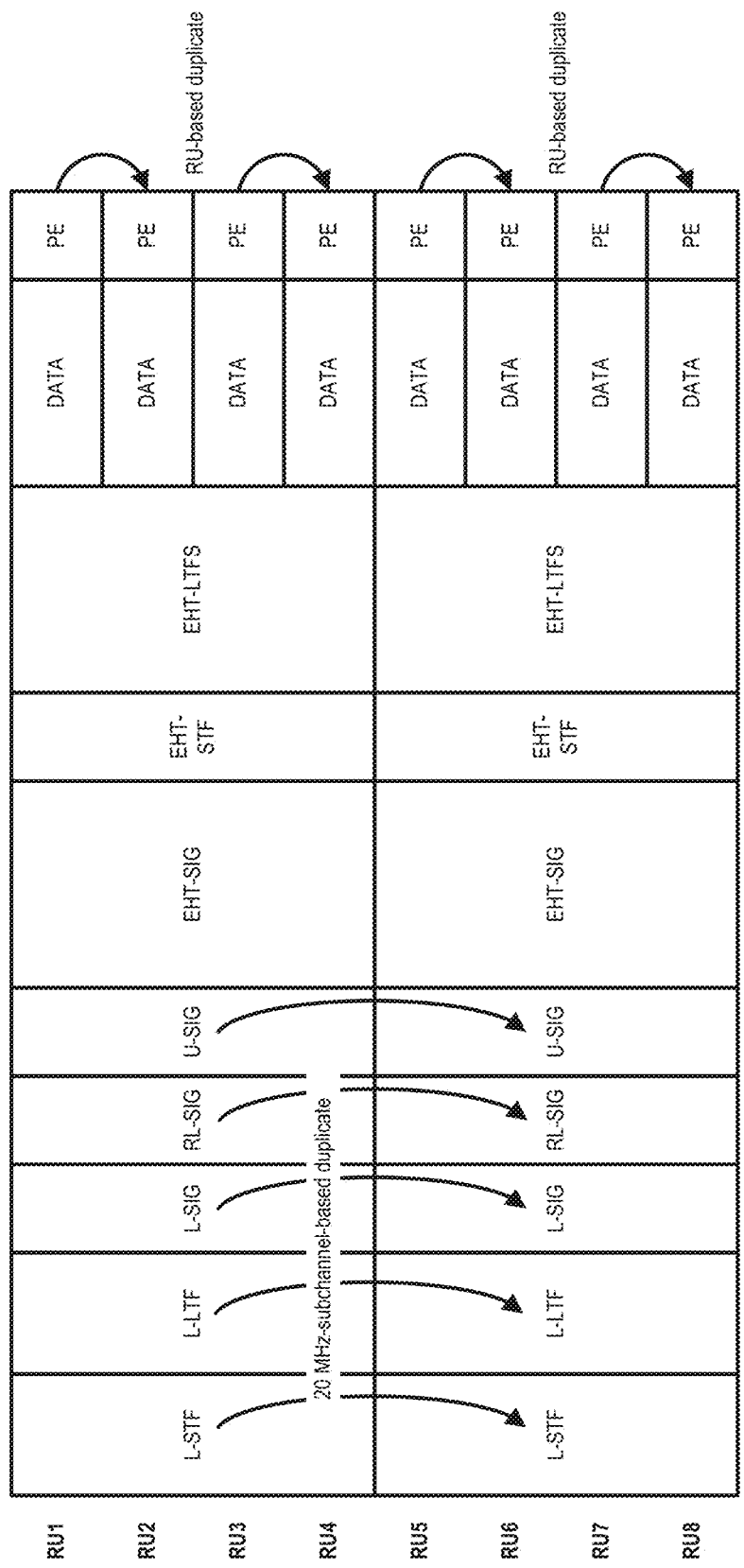
FIG. 26 shows another PPDU format with frequency domain duplication, according to some example embodiments.
Figure 27:
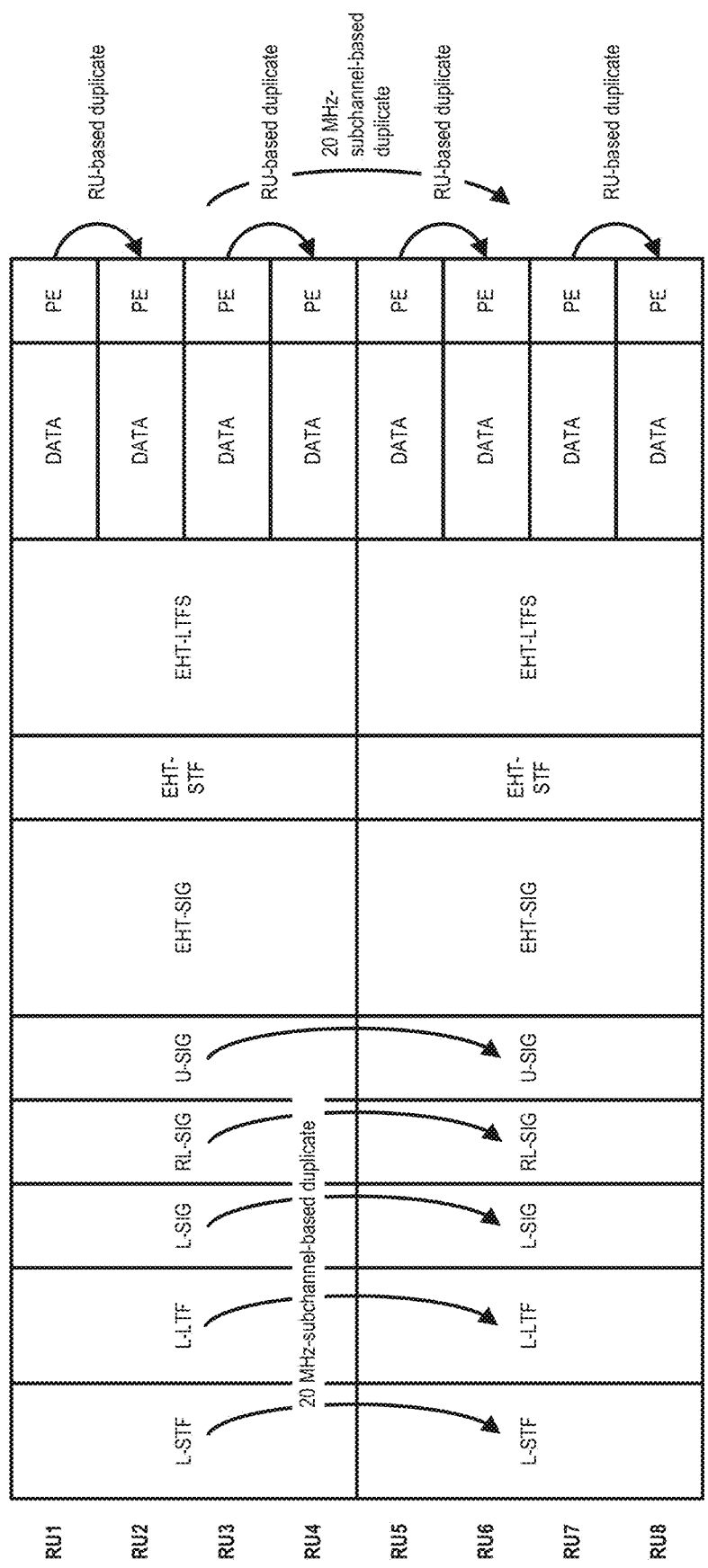
FIG. 27 shows another PPDU format with frequency domain duplication, according to some example embodiments.

FIGS. 25-27 show various PPDU formats with frequency domain duplication, according to some example embodiments. While certain PPDU formats are shown in the figures, it should be understood that other formats are possible.

In the PPDU format shown in FIG. 25, the data included in RU1 (in the DATA field) is duplicated in the frequency domain in each of the other RUs (RU1, RU2, . . . , and RU8). Also, the L-STF field, L-LTF field, L-SIG field, RL-SIG field, and U-SIG field are duplicated in the frequency domain in units of 20 MHz subchannels.

In the PPDU format shown in FIG. 26, the data included in RU1 (in the DATA field) is duplicated in the frequency domain in RU2, the data included in RU 3 is duplicated in the frequency domain in RU4, the data included in RU 5 is duplicated in the frequency domain in RU6, and the data included in RU 7 is duplicated in the frequency domain in RU8. The L-STF field, L-LTF field, L-SIG field, RL-SIG field, and U-SIG field are duplicated in the frequency domain in units of 20 MHz subchannels.

In the PPDU format shown in FIG. 27, the data included in RU1 (in the DATA field) is duplicated in the frequency domain in RU2 and the data included in RU 3 is duplicated in the frequency domain in RU4. The data included in RU1, RU2, RU3, and RU4 is duplicated in the frequency domain in RU5, RU6, RU7, and RU8 (RU-based duplication is applied in the 20 MHz subchannel and then 20 MHz subchannel-based duplication is applied in the 40 MHz channel). The L-STF field, L-LTF field, L-SIG field, RL-SIG field, and U-SIG field are duplicated in the frequency domain in units of 20 MHz subchannels.

In one embodiment, time domain repetition can be used to extend communication range. In terms of network management, occupation of a narrow band for a longer time may be more preferable than occupation of wide band for shorter time. In such cases, techniques such as the previously mentioned multiple carrier modulation techniques (DCM, QCM, OCM, etc.) and RU-based duplication techniques may not be adequate for communication range extension. Thus, embodiments may use time domain repetition as described herein to extend communication range.

Figure 28:
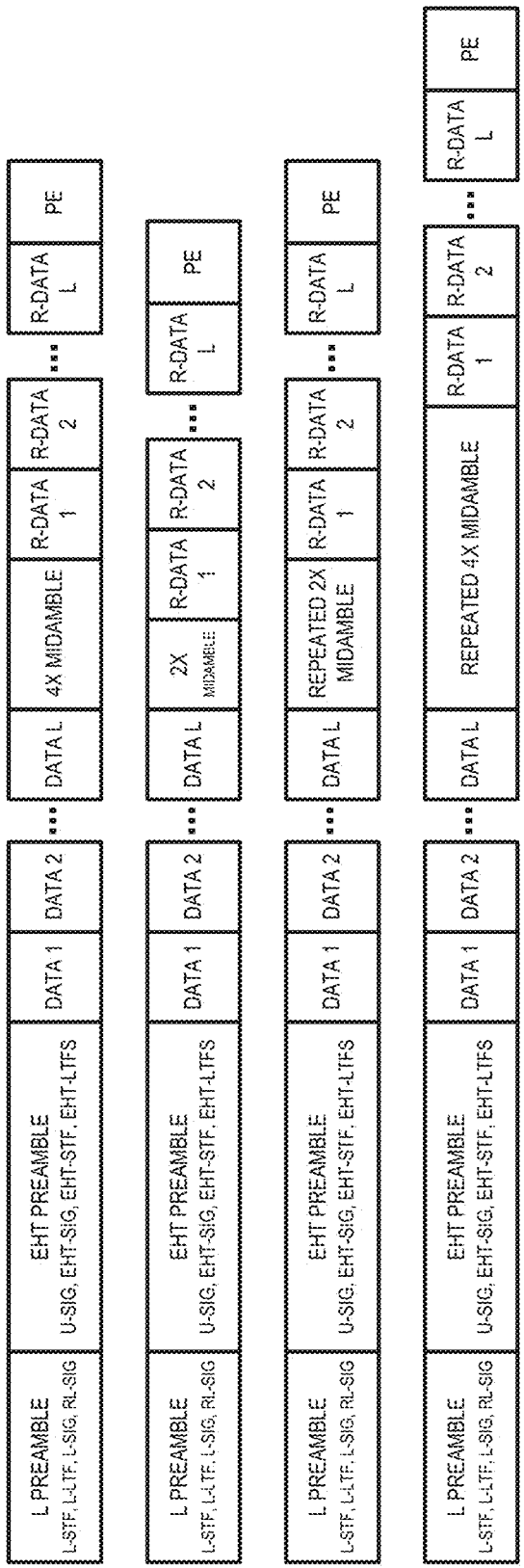
FIG. 28 shows various PPDU formats with time domain repetition, according to some example embodiments.
Figure 29:
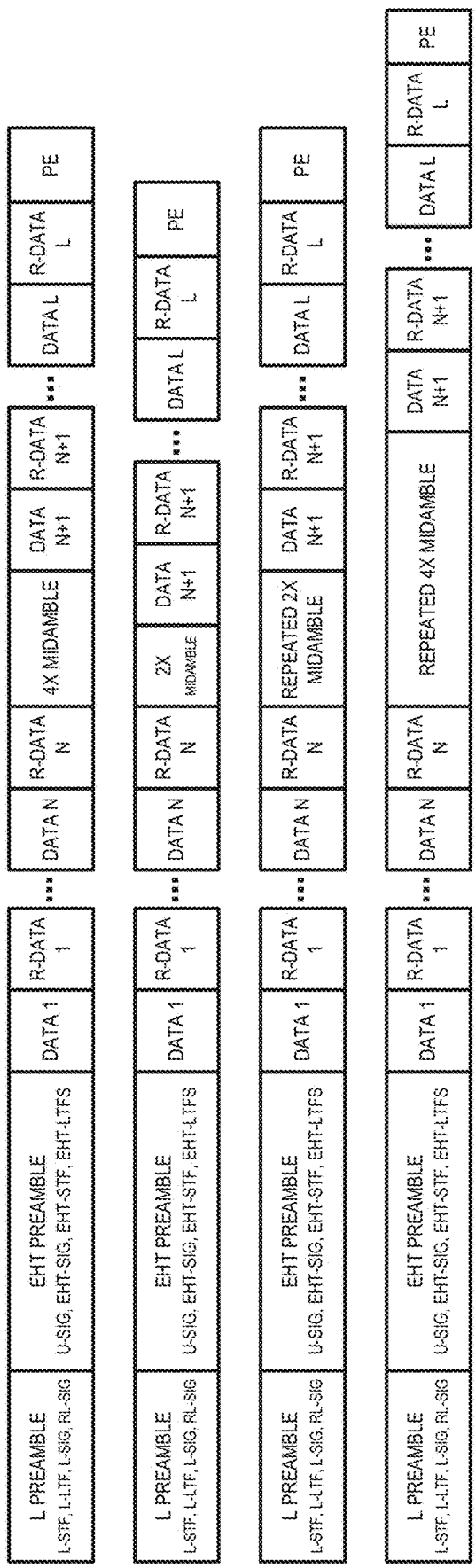
FIG. 29 shows various PPDU formats with orthogonal frequency division multiplexing (OFDM) symbol-by-symbol time domain repetition, according to some example embodiments.

To avoid packet error performance degradation, which may be caused by longer packet transmission times, midambles for enhanced channel estimation may be inserted in the middle of a PPDU, especially in the middle of data symbols (e.g., in the middle of the symbols in the DATA field), as shown in FIGS. 28 and 29. For the midamble, EHT-LTF fields or its variations can be considered. For example, 1×, 2×, 4×OFDM symbol durations can be used and power boosting and repetition of midamble may be used. FIGS. 28 and 29 show various PPDU formats with time domain repetition (to help extend communication range), according to some example embodiments. In the time domain repeated PPDU formats shown in FIG. 28, multiple data OFDM symbols (e.g., L OFDM symbols in FIG. 28) are repeated with a boundary of the midamble. In other words, the original data (DATA 1 to DATA L) is followed by a midamble and then followed by repeated data (R-DATA 1 to R-DATA L). When the original and repeated data parts are too long, additional midambles may be inserted (e.g., periodically) to allow for the channel response to be estimated more accurately. In this case, the locations of the midambles (e.g., the midamble periodicity) may be indicated in the U-SIG field or EHT-SIG field. While certain midamble formats are shown in the figure (e.g., 4× midamble, 2× midamble, repeated 2× midamble, and repeated 4× midamble), it should be understood that these are provided by way of example, and that other midamble formats are possible. For example, 1× midamble or four-time repeated midamble are possible. In one embodiment, power boosting is applied to the midamble.

Using such a PPDU format, marginal time diversity may be obtained. While the figure shows data being repeated twice, more repetitions (e.g., 3× repetition, 4× repetition, etc.) are possible. In one embodiment, shuffling of subcarriers can be employed to obtain more diversity gain (frequency diversity).

Figure 30:
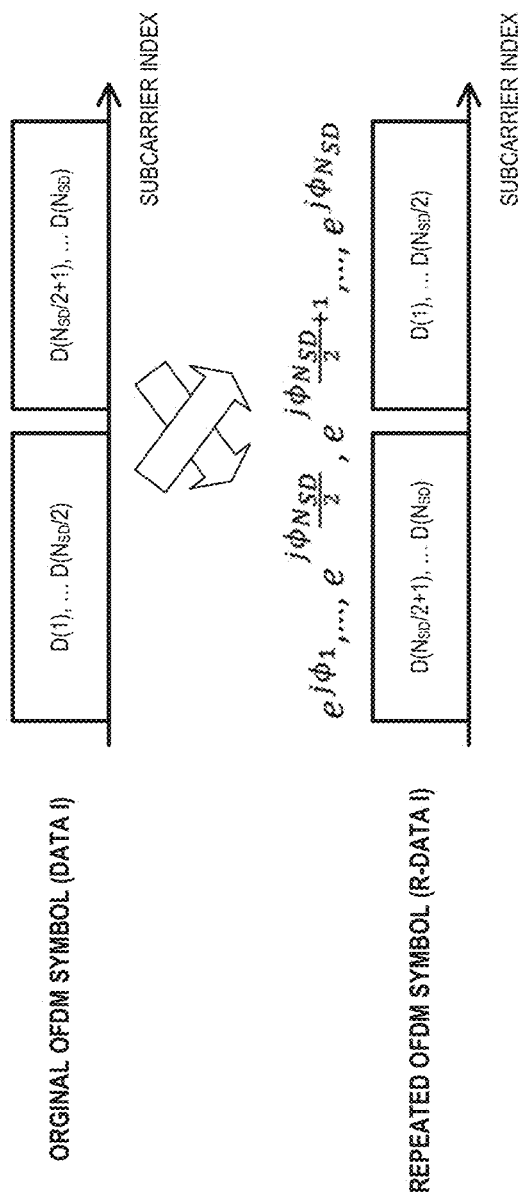
FIG. 30 shows a repeated OFDM symbol structure with subcarrier shuffling and phase shift, according to some example embodiments.

FIG. 29 shows PPDU formats with OFDM symbol-by-symbol time domain repetition, according to some example embodiments. As shown in FIG. 29, each data OFDM symbol (DATA I, where I=1, L) is followed by the corresponding repeated data OFDM symbol (R-DATA I, where I=1 L). In the PPDU formats shown in the figure, the midamble is not the boundary of the original data and the repeated data. Two consecutive OFDM symbols (e.g., DATA 1 and R-DATA 1) contain the same information. In one embodiment phase rotation and/or subcarrier shuffling is applied to the modulated signal in the repeated OFDM symbol (e.g., R-DATA 1). FIG. 30 shows a repeated OFDM symbol structure with subcarrier shuffling and phase shift, according to some example embodiments. In FIG. 30, $N_{SD}$ is the number of total data subcarriers in an OFDM symbol, and $\phi_i$ is the phase rotation value for the i-th data subcarrier. In one embodiment, when the original and repeated data OFDM symbol pairs are too long, midambles may be inserted (e.g., periodically) to estimate the channel response more accurately. In this case, the midamble periodicity may be indicated in the U-SIG field or EHT-SIG field. In the example shown in FIG. 30, a midamble is inserted after N OFDM symbol pairs (e.g., after N DATA and R-DATA pairs).

The PPDU formats shown in FIGS. 28 and 29 are based on the EHT PPDU format, which is designed with consideration of backwards compatibility with legacy standards operating in the 5 GHz band such as IEEE 802.11a, 11n, 11ax, and so on. However, as mentioned above, in the 6 GHz band there are expected to be no legacy devices because this band has been recently open for use. Without having to consider backwards compatibility, a more efficient PPDU format with shorter preambles can be used. Such a shorter PPDU format may be referred to herein as a "green field" (GF) PPDU format. In contrast, a PPDU format that includes a legacy preamble portion to provide backwards compatibility may be referred to herein as a "mixed mode" PPDU format.

FIG. 31 shows a mixed mode PPDU format and a green field PPDU format, according to some example embodiments. As shown in the figure, the mixed mode PPDU format includes a L-STF field 3102, a L-LTF field 3104, a L-SIG field 3106, a RL-SIG field 3108, a U-SIG field 3110, an EHT-SIG field 3112, an EHT-STF field 3114, EHT-LTF fields 3116, a data field 3118, and a packet extension field 3120. Also, as shown in the figure, the green field PPDU format includes an EHT-STF field 3122, an EHT-LTF field 3124, a U-SIG1 field 3126, a U-SIG2 field 3128, an EHT-SIG field 3130, EHT-LTF fields 3132, a data field 3134, and a packet extension field 3136.

In one embodiment, one or more of the three communication range extension techniques described above (multi-carrier modulation, frequency domain duplication, and time domain repetition) can be applied to the green field PPDU format. For example, DCM, QCM, or OCM may be applied to the data part modulation as applied in the mixed mode format.

Figure 32:
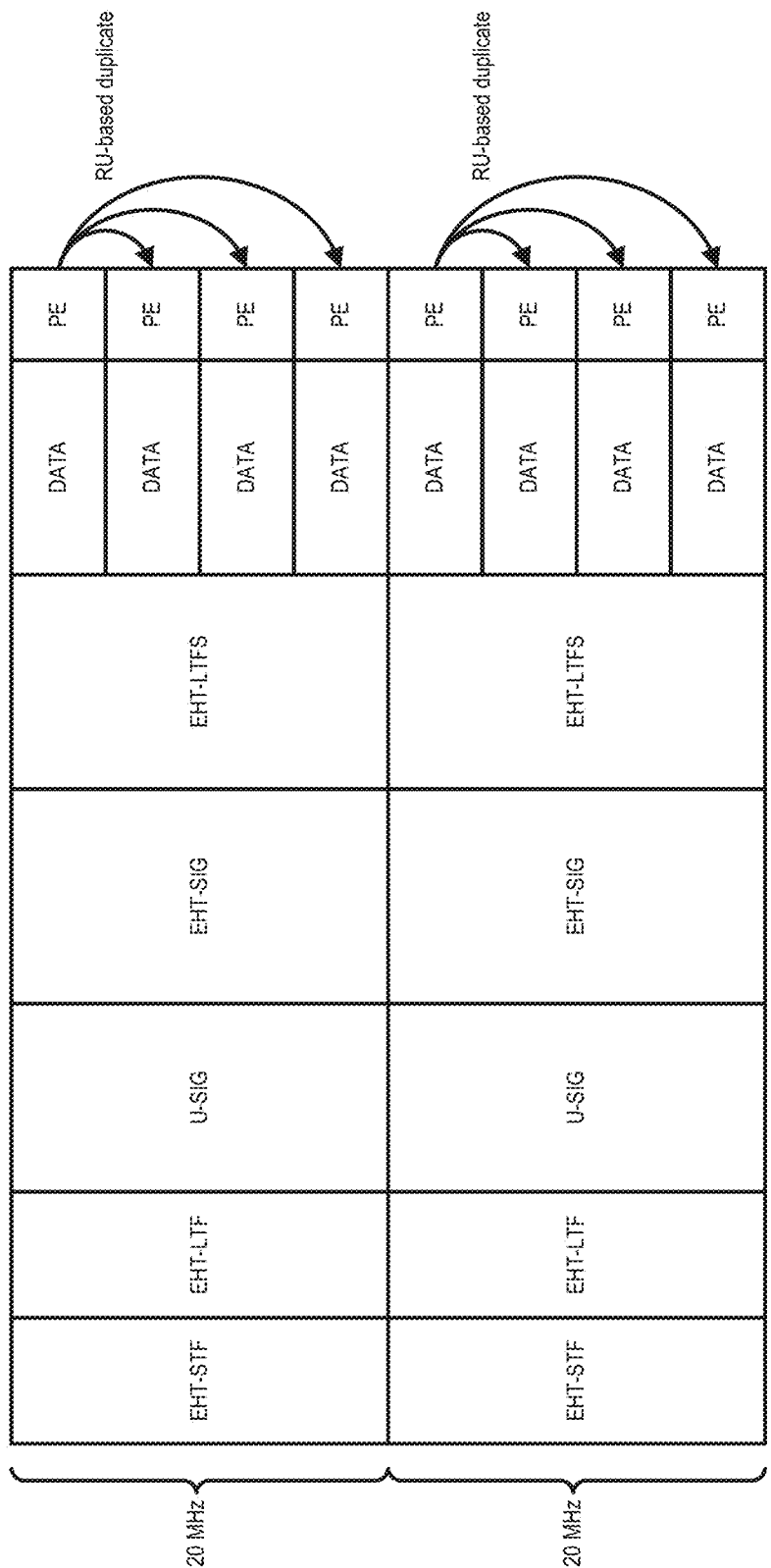
FIG. 32 shows a green field PPDU format with frequency domain duplication, according to some example embodiments.
Figure 33:
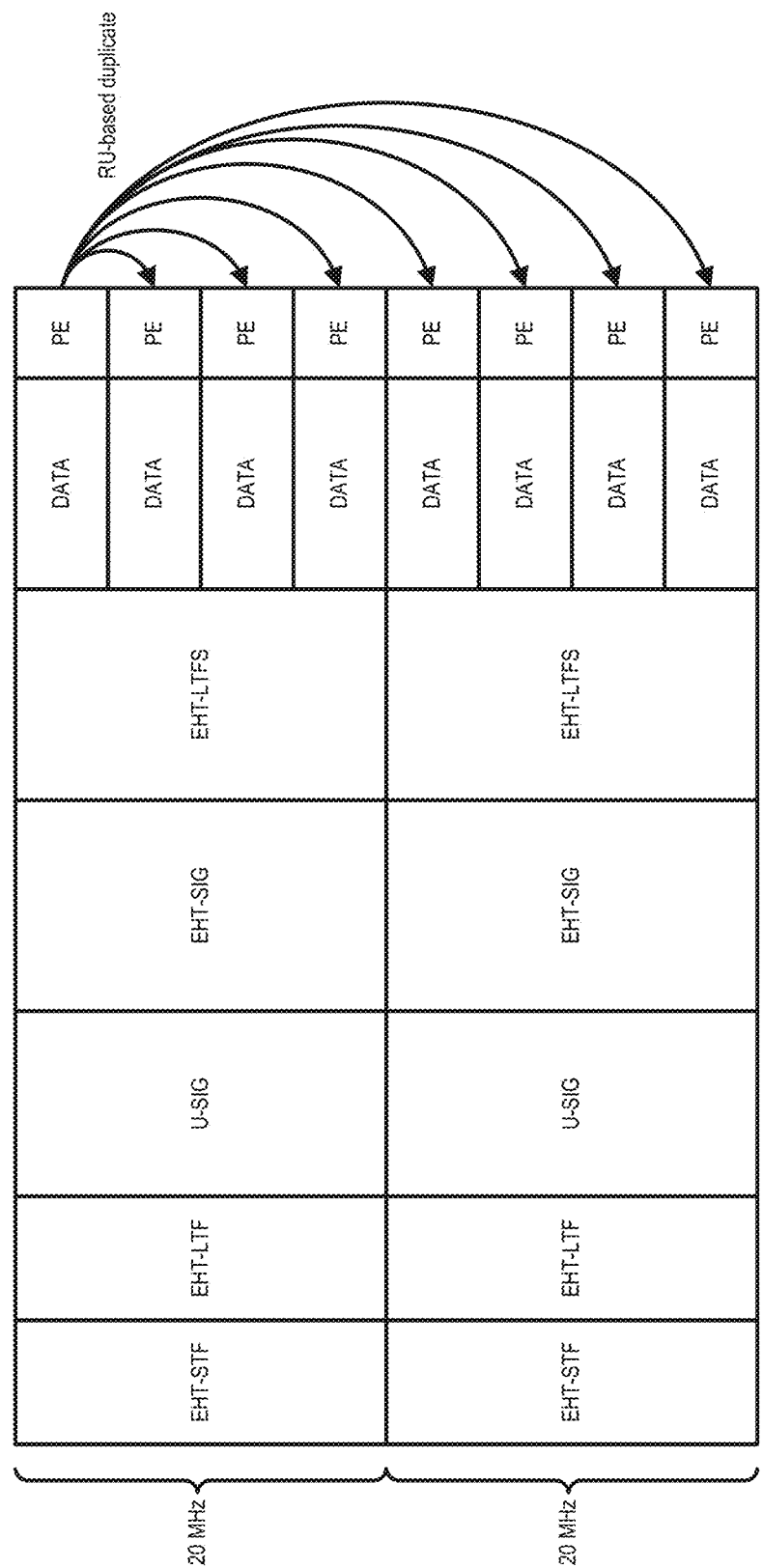
FIG. 33 shows another green field PPDU format with frequency domain duplication, according to some example embodiments.
Figure 34:
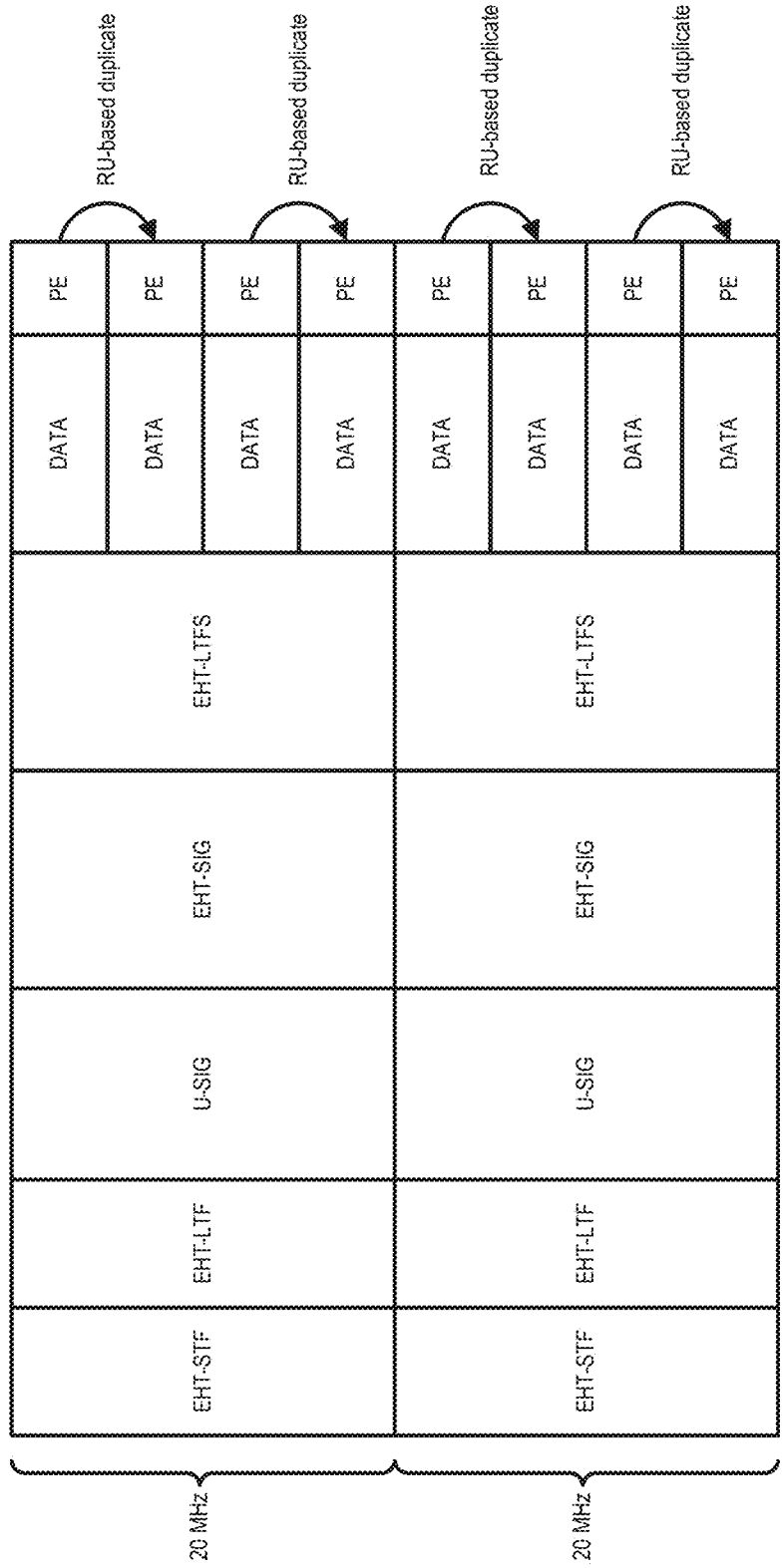
FIG. 34 shows another green field PPDU format with frequency domain duplication, according to some example embodiments.

As another example, frequency domain duplication may be applied to the green field PPDU format. FIGS. 32-34 show various green field PPDU formats with frequency domain duplication, according to some example embodiments. While certain PPDU formats are shown in the figures, it should be understood that other formats are possible.

In the PPDU format shown in FIG. 32, the data included in RU1 (in the DATA field) is duplicated in the frequency domain in RU2, RU3, and RU4 and the data included in RU5 is duplicated in the frequency domain in RU6, RU7, and RU8. In the PPDU format shown in FIG. 33, the data included in RU1 (in the DATA field) is duplicated in the frequency domain in each of the RUs (RU1, RU2, . . . , and RU8). In the PPDU format shown in FIG. 34, the data included in RU1 (in the DATA field) is duplicated in the frequency domain in RU2, the data included in RU 3 is duplicated in the frequency domain in RU4, the data included in RU5 is duplicated in the frequency domain in RU6, and the data included in RU7 is duplicated in the frequency domain in RU8.

Figure 35:
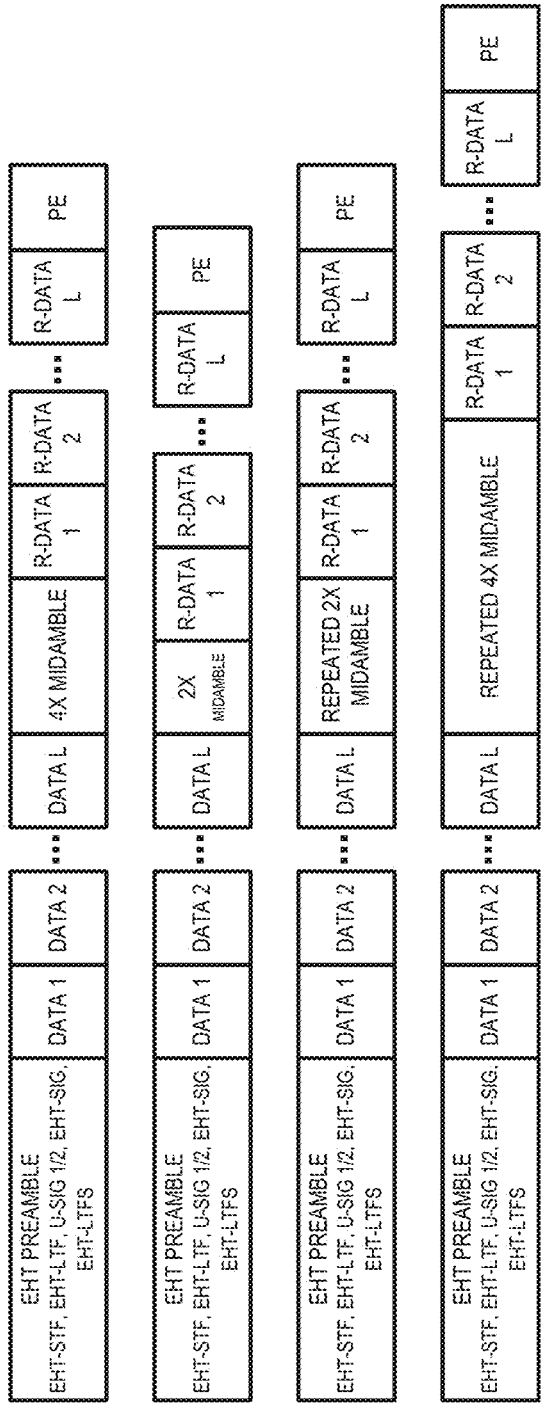
FIG. 35 shows various green field PPDU formats with time domain repetition, according to some example embodiments.
Figure 36:
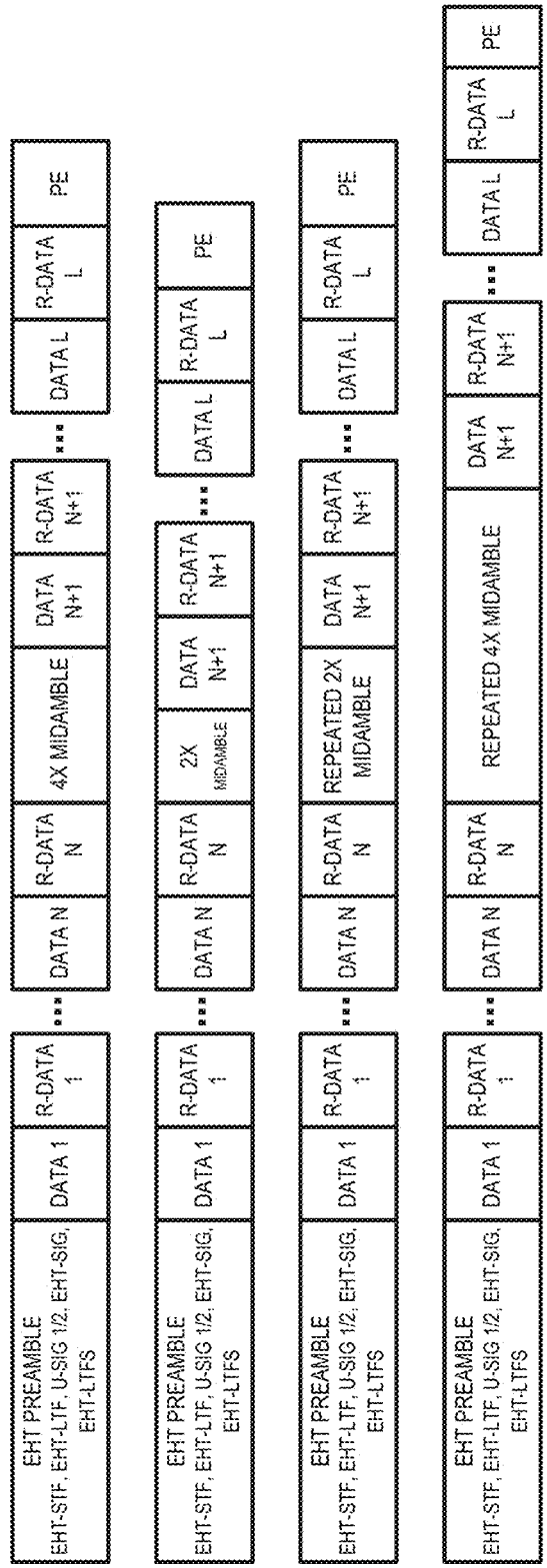
FIG. 36 shows various green field PPDU formats with OFDM symbol-by-symbol time domain repetition, according to some example embodiments.

As another example, time domain repetition may be applied to the green field PPDU format. FIGS. 35 and 36 show various green field PPDU formats with time domain repetition, according to some example embodiments. While certain PPDU formats are shown in the figures, it should be understood that other formats are possible.

In the PPDU formats shown in FIG. 35, the original data (DATA 1 to DATA L) is followed by a midamble and then followed by repeated data (R-DATA 1 to R-DATA L). These PPDU formats are similar to the PPDU formats shown in FIG. 28 but applied to a green field PPDU. While certain midamble formats are shown in the figure (e.g., 4× midamble, 2× midamble, repeated 2× midamble, and repeated 4× midamble), it should be understood that these are provided by way of example, and that other midamble formats are possible.

In the PPDU formats shown in FIG. 36, each data OFDM symbol (DATA I, where I=1, L) is followed by the corresponding repeated data OFDM symbol (R-DATA I, where I=1 L). That is, these PPDU formats are OFDM symbol-by-symbol repetition PPDU formats similar to the PPDU formats shown in FIG. 29 but applied to a green field PPDU.

In one embodiment, in the green field PPDU formats for range extension, the length of the EHT-STF field and/or the EHT-LTF field is extended to enhanced packet detection, synchronization, and channel estimation. Also, power-boosting may be applied to the EHT-SFT field and/or EHT-LTF field.

In one embodiment, the MCS field and/or DCM field is used to indicate a PPDU having an extended range format. The MCS field and/or DCM field may be in the EHT-SIG field. Considering that a lower MCS is proper to support a robust PPDU format, MCSO and DCM enabled may implicitly indicate the extended range PPDU format in case any types of duplication is applied to the data portion.

In one embodiment, each midamble is in the same format as the EHT-LTF field(s) in the preamble portion of the same PPDU. In one embodiment, the generation of the time domain symbol of a 1×EHE-LTF (or corresponding midamble) is equivalent to modulating every 4 subcarriers in an OFDM symbol of 4×EHT-LTF (e.g., 12.8 μs excluding GI), and then transmitting only the first one fourth (¼) of the OFDM symbol in the time domain. In one embodiment, the generation of the time domain symbol of a 2× HE-LTF is equivalent to modulating every other subcarrier in an OFDM symbol of 4×EHT-LTF (e.g., 12.8 μs excluding GI), and then transmitting only the first half (½) of the OFDM symbol in the time domain.

A new modulation technique, frequency domain duplication technique, and time domain repetition technique have been described herein to extend communication range. Also, a new PPDU format (green field PPDU format) has been described. Using one or more of the techniques described herein and/or the new PPDU format, communication range can be extended when operating in the 6 GHz band. For example, the communication range of a 6 GHz BSS can be extended to be comparable to that of the existing 5 GHz BSS.

Turning now to FIG. 37, a method 3700 will be described for extending communication range when operating in a 6 Gigahertz (GHz) band of a wireless network, in accordance with an example embodiment. The method 3700 may be performed by one or more devices described herein. For example, the method 3700 may be performed by a wireless device 104. Additionally, although shown in a particular order, in some embodiments the operations of the method 3700 may be performed in a different order. For example, although the operations of the method 3700 are shown in a sequential order, some of the operations may be performed in partially or entirely overlapping time periods.

As shown in FIG. 37, the method 3700 may commence at operation 3702 with a wireless device (e.g., a WLAN device 104) generating a PPDU that includes a preamble portion and a data portion (e.g., DATA field) that incudes first data. The PPDU may have a mixed mode PPDU format (block 3704) or a green field PPDU format (block 3706), as described herein above.

At operation 3708, the wireless device transmits the PPDU through a wireless medium on a transmission channel. The wireless device may transmit the PPDU using one or more of the communication range extension techniques described in blocks 3710-3718.

In one embodiment, the transmission channel may be subdivided into a plurality of RUs and the first data may be duplicated in the data portion in a frequency domain in units of RUs (block 3710: frequency domain duplication for data). In one embodiment, all of the plurality of RUs have a same RU size, wherein the same RU size is one of 26 tones, 52 tones, 106 tones, 242 tones, 484 tones, 996 tones, and 2×996 tones. In one embodiment, the preamble portion includes one or more preamble fields that are duplicated in the preamble portion in the frequency domain in units of 20 MHz subchannels. In one embodiment, the first data is duplicated in the data portion in each of the plurality of RUs. In one embodiment, the data portion further includes second data that is different from the first data, wherein the second data is duplicated in the data portion in the frequency domain in units of RUs. In one embodiment, the plurality of RUs includes a first RU, a second RU that is adjacent to the first RU, a third RU that is adjacent to the second RU, and a fourth RU that is adjacent to the third RU, wherein the first data is duplicated in the first RU and the second RU, wherein the second data is duplicated in the third RU and fourth RU. In one embodiment, the plurality of RUs further includes a fifth RU that is adjacent to the fourth RU, a sixth RU that is adjacent to the fifth RU, a seventh RU that is adjacent to the sixth RU, and an eight RU that is adjacent to the seventh RU, wherein the first data is further duplicated in the fifth RU and the sixth RU, wherein the second data is further duplicated in the seventh RU and the eight RU.

In one embodiment, the first data is repeated in the data portion in a time domain (block 3712: time domain repetition for data). In one embodiment, the data portion further includes a repetition of the first data that follows the first data in the time domain with a midamble inserted between the first data and the repetition of the first data in the time domain. In one embodiment, the data portion includes OFDM symbol-by-symbol repetitions of the first data in the time domain, wherein a midamble is inserted after a predefined or specified number of the OFDM symbol-by-symbol repetitions in the time domain.

In one embodiment, QCM or OCM is applied to the data portion (block 3714: multi-carrier modulation for data).

In one embodiment, one or more preamble fields are duplicated in the preamble portion in a frequency domain (e.g., in units of 20 MHz) (block 3716: frequency domain duplication for preamble).

In one embodiment, one or more preamble fields are repeated in the preamble portion in the time domain (block 3718: time domain repetition for preamble).

While embodiments have been described for extending communication range of a wireless device operating in a 6 GHz band, the techniques described herein are not limited to being used in the 6 GHz band. For example, the techniques disclosed herein may be used to extend the communication range of a wireless device operating in a different frequency band (e.g., one that becomes open for use in the future).

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method by a wireless device to extend communication range in a wireless network, comprising:
   generating a physical layer protocol data unit (PPDU) that includes a preamble portion and a data portion that includes first data, the preamble portion comprising an extremely high throughput signal field (EHT-SIG) and a modulation and coding scheme (MCS) field implicitly indicating a PPDU duplicated in terms of resource units (RUs); and
   transmitting the PPDU through the wireless network on a transmission channel that is subdivided into a plurality of RUs,
   wherein the PPDU has a green field PPDU format formed by removing backwards compatible parts from an EHT PPDU format when an EHT wireless device operates in a 6 gigahertz (GHz) band.

2. The method of claim 1,
   wherein the preamble portion includes one or more preamble fields that are duplicated in the preamble portion in the frequency domain in units of 20 Megahertz (MHz) subchannels,
   wherein each of the duplicated 20 MHz subchannels have a different phase shift to reduce a peak-to-average power ratio (PAPR) of the PPDU,
   wherein dual carrier modulation (DCM) is used to extend the range of the PPDU and each RU is subdivided into half RUs and the same information is included in each half RU,
   wherein phase rotation is applied to one or more of the half RUs.

3. The method of claim 1, wherein all of the plurality of RUs have a same RU size, wherein the same RU size is one of 26 tones, 52 tones, 106 tones, 242 tones, 484 tones, 996 tones, and 2×996 tones.

4. The method of claim 1, wherein the first data is duplicated in the data portion in each of the plurality of RUs.

5. The method of claim 1, wherein the data portion further includes second data that is different from the first data, wherein the second data is duplicated in the data portion in the frequency domain in units of RUs.

6. The of claim 5, wherein the plurality of RUs includes a first RU, a second RU that is adjacent to the first RU, a third RU that is adjacent to the second RU, and a fourth RU that is adjacent to the third RU, wherein the first data is duplicated in the first RU and the second RU, wherein the second data is duplicated in the third RU and fourth RU.

7. The method of claim 6, wherein the plurality of RUs further includes a fifth RU that is adjacent to the fourth RU, a sixth RU that is adjacent to the fifth RU, a seventh RU that is adjacent to the sixth RU, and an eighth RU that is adjacent to the seventh RU, wherein the first data is further duplicated in the fifth RU and the sixth RU, wherein the second data is further duplicated in the seventh RU and the eighth RU.

8. The method of claim 1, wherein quad-carrier modulation (QCM) or octa-carrier modulation (OCM) is applied to the data portion of the PPDU.

9. The method of claim 1, wherein the first data is repeated in the data portion in a time domain.

10. The method of claim 9, wherein the data portion further includes a repetition of the first data that follows the first data in the time domain with a midamble inserted between the first data and the repetition of the first data in the time domain.

11. The method of claim 9, wherein the data portion includes Orthogonal Frequency Division Multiplexing (OFDM) symbol-by-symbol repetitions of the first data in the time domain, wherein a midamble is inserted after a predefined or specified number of the OFDM symbol-by-symbol repetitions in the time domain.

12. The method of claim 1, wherein the preamble portion includes one or more preamble fields that are repeated in the preamble portion in a time domain.

13. The method of claim 1, wherein the wireless device operates in a 6 Gigahertz (GHz) band of the wireless network.

14. A wireless device to extend communication range, comprising:
   a radio frequency transceiver;
   a memory device that stores a set of instructions; and
   a processor coupled to the memory device, wherein the set of instructions when executed by the processor causes the wireless device to:
      generate a physical layer protocol data unit (PPDU) that includes a preamble portion and a data portion that includes first data, the preamble portion comprising an extremely high throughput signal field (EHT-SIG) and a modulation and coding scheme (MCS) field that implicitly indicates a PPDU duplicated in terms of resource units (RUs); and
      transmit the PPDU through a wireless medium on a transmission channel that is subdivided into a plurality of RUs,
   wherein the PPDU has a green field PPDU format formed by removing backwards compatible parts from an EHT PPDU format when an EHT wireless device operates in a 6 gigahertz (GHz) band.

15. The wireless device of claim 14,
   wherein the preamble portion includes one or more preamble fields that are duplicated in the preamble portion in the frequency domain in units of 20 Megahertz (MHz) subchannels,
   wherein each of the duplicated 20 MHz subchannels have a different phase shift to reduce a peak-to-average power ratio (PAPR) of the PPDU,
   wherein dual carrier modulation (DCM) is used to extend the range of the PPDU and each RU is subdivided into half RUs and the same information is included in each half RU,
   wherein phase rotation is applied to one or more of the half RUs.

16. The wireless device of claim 14, wherein all of the plurality of RUs have a same RU size, wherein the same RU size is one of 26 tones, 52 tones, 106 tones, 242 tones, 484 tones, 996 tones, and 2×996 tones.

17. The wireless device of claim 14, wherein the first data is duplicated in the data portion in each of the plurality of RUs.

18. The wireless device of claim 17, wherein the data portion further includes second data that is different from the first data, wherein the second data is duplicated in the data portion in the frequency domain in units of RUs.

19. The wireless device of claim 14, wherein the first data is repeated in the data portion in a time domain.

20. The wireless device of claim 14, wherein the wireless device operates in a 6 Gigahertz (GHz) band of a wireless network.

* * * * *